United States Patent
Pfaff et al.

(10) Patent No.: US 11,659,169 B2
(45) Date of Patent: May 23, 2023

(54) AFFINE LINEAR WEIGHTED INTRA PREDICTIONS

(71) Applicant: Fraunhofer-Gesellschaft zur Förderung der angewandten Forschung e.V., Munich (DE)

(72) Inventors: Jonathan Pfaff, Berlin (DE); Heiko Schwarz, Berlin (DE); Philipp Helle, Berlin (DE); Michael Schäfer, Berlin (DE); Roman Rischke, Berlin (DE); Tobias Hinz, Berlin (DE); Philipp Merkle, Berlin (DE); Björn Stallenberger, Berlin (DE); Martin Winken, Berlin (DE); Mischa Siekmann, Berlin (DE); Detlev Marpe, Berlin (DE); Thomas Wiegand, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/198,750

(22) Filed: Mar. 11, 2021

(65) Prior Publication Data
US 2021/0218960 A1  Jul. 15, 2021

Related U.S. Application Data

(63) Continuation of application No. PCT/EP2019/074504, filed on Sep. 13, 2019.

(30) Foreign Application Priority Data

Sep. 13, 2018  (EP) .................................... 18194357

(51) Int. Cl.
H04N 19/176 (2014.01)
H04N 19/593 (2014.01)
(Continued)

(52) U.S. Cl.
CPC ........... *H04N 19/11* (2014.11); *H04N 19/176* (2014.11); *H04N 19/48* (2014.11); *H04N 19/593* (2014.11)

(58) Field of Classification Search
CPC .... H04N 19/176; H04N 19/18; H04N 19/159; H04N 19/48; H04N 19/593
See application file for complete search history.

(56) References Cited

U.S. PATENT DOCUMENTS 9,313,502 B2  4/2016  Song et al.
9,319,682 B2  4/2016  Togita
(Continued)

FOREIGN PATENT DOCUMENTS

CN  107736027 A   2/2018
EP    1512115 B1  12/2013
(Continued)

OTHER PUBLICATIONS

Gary Sullivan et al. "Overview of the High Efficiency Video Coding (HEVC) Standard, IEEE Transactions on Circuits and Systems for Video Technology", vol. 22, No. 12, Dec. 2012, XP055388661, 2012.
(Continued)

*Primary Examiner* — Tsion B Owens
(74) *Attorney, Agent, or Firm* — Spencer C. Patterson; Grable Martin Fulton PLLC

(57) ABSTRACT

There are disclosed techniques for block wise encoding and decoding. The techniques may be applied to encoders, decoders, and methods for encoding and/or decoding.
In one example, there is provided a technique to decode (resp. decode) a predetermined block of the picture by
assigning, based on a first signalization in the data stream, the predetermined block to the first set or the second set, (Continued)

sorting the assigned set of intra-prediction modes according to intra-prediction modes used for neighboring blocks, neighboring the predetermined block, to obtain a list of intra prediction modes, deriving, for the predetermined block, from the data stream, an index into the list of intra prediction modes, predicting the predetermined block using an intra prediction mode onto which the index points.

The decoder (resp. encoder), if the assigned set is the first set of intra-prediction modes, in sorting the assigned set, uses a second mapping which maps each intra-prediction mode of the second set of prediction modes onto a representative one in the first set of intra-prediction modes.

33 Claims, 15 Drawing Sheets

(51) Int. Cl.
*H04N 19/11* (2014.01)
*H04N 19/48* (2014.01)

(56) References Cited

U.S. PATENT DOCUMENTS

| | | | |
|---|---|---|---|
| 9,654,785 | B2 | 5/2017 | Chien et al. |
| 10,554,969 | B2 | 2/2020 | Lee et al. |
| 11,044,467 | B2 | 6/2021 | Lainema |
| 2014/0105276 | A1 | 4/2014 | Nakamura et al. |
| 2018/0176598 | A1* | 6/2018 | Guo ................. H04N 19/122 |
| 2018/0184123 | A1 | 6/2018 | Terada et al. |
| 2019/0306532 | A1* | 10/2019 | Ikonin ................ H04N 19/14 |
| 2020/0244955 | A1 | 7/2020 | Pfaff et al. |
| 2020/0322620 | A1* | 10/2020 | Zhao ................ H04N 19/186 |
| 2021/0037241 | A1* | 2/2021 | Lee .................... H04N 19/70 |
| 2021/0144369 | A1* | 5/2021 | Kotra ................. H04N 19/70 |
| 2021/0274175 | A1* | 9/2021 | Lim .................. H04N 19/167 |
| 2021/0274215 | A1* | 9/2021 | Kang ................. H04N 19/56 |

FOREIGN PATENT DOCUMENTS

| | | |
|---|---|---|
| EP | 2608541 B1 | 10/2016 |
| EP | 3310058 A1 | 4/2018 |
| WO | 2003105070 A1 | 12/2003 |
| WO | 2016199330 A1 | 12/2016 |
| WO | 2018127624 A1 | 7/2018 |

OTHER PUBLICATIONS

R. Song et al., "Neural network-based arithmetic Coding of Intra Prediction Modes in HEVC", arxiv org, Cornell University Library, 201 Olin Library Cornell University Ithaca, NY 14853, Sep. 18, 2017, XP080821887, 2017.

Pfaff J. et al., "Intra Prediction Modes based on Neural Networks", 10. JVET Meeting, Apr. 2018 San Diego, (The Joint Video Exploration Team of ISO/IEC JTC1/SC29/WG11 and ITU-T SG.16), XP030151210, 2018.

* cited by examiner

AFFINE LINEAR WEIGHTED INTRA PREDICTIONS

CROSS-REFERENCES TO RELATED APPLICATIONS

This application is a continuation of copending International Application No. PCT/EP2019/074504, filed Sep. 13, 2019, which is incorporated herein by reference in its entirety, and additionally claims priority from European Application No. EP 18194357.2, filed Sep. 13, 2018, which is incorporated herein by reference in its entirety.

The present document relates to techniques including, inter alia, Affine Linear Weighted Intra Predictions (ALWIPs).

BACKGROUND OF THE INVENTION

Different inventive embodiments and aspects will be described. At least some of these embodiments refer, inter alia, to methods and/or apparatus for video coding, such as High Efficiency Video Coding (HEVC).

Also, further embodiments will be defined by the enclosed claims.

It should be noted that any embodiments as defined by the claims can be supplemented, in some cases optionally, by any of the details (features and functionalities) described in the following chapters.

Also, the embodiments described in the following chapters can be used individually, and can also be supplemented by any of the features in another chapter, or by any feature included in the claims.

Also, it should be noted that individual aspects described herein can be used individually or in combination. Thus, details can be added to each of said individual aspects without adding details to another one of said aspects.

It should also be noted that the present disclosure describes, explicitly or implicitly, features of decoding and/or encoding system and/or method.

Moreover, features and functionalities disclosed herein relating to a method can also be used in an apparatus. Furthermore, any features and functionalities disclosed herein with respect to an apparatus can also be used in a corresponding method. In other words, the methods disclosed herein can be supplemented by any of the features and functionalities described with respect to the apparatuses.

Also, any of the features and functionalities described herein can be implemented in hardware or in software, or using a combination of hardware and software, as will be described in the section "implementation alternatives".

Moreover, any of the features described in parentheses ("( . . . )" or "[ . . . ]") can be optional in some examples.

The achievement of more performing techniques for predicting blocks to be encoded and/or decoded is a constant goal of the technology. For example, it is advantageous to efficiently compress the datastreams to reduce the length of the code.

SUMMARY

One embodiment may have a decoder for decoding a picture from a data stream supporting a first set of intra-prediction modes including a plurality of directional prediction modes and at least one of a DC mode and a planar mode, and a second set of intra-prediction mode, configured to decode a predetermined block of the picture by
assigning, based on a first signalization in the data stream, the predetermined block to the first set or the second set,
sorting the assigned set of intra-prediction modes according to intra-prediction modes used for neighboring blocks, neighboring the predetermined block, to obtain a list of intra prediction modes,
deriving, for the predetermined block, from the data stream, an index into the list of intra prediction modes,
predicting the predetermined block using an intra prediction mode onto which the index points,
wherein decoder is configured to,
if the assigned set is the first set of intra-prediction modes, in sorting the assigned set, use a second mapping which maps each intra-prediction mode of the second set of prediction modes onto a representative one in the first set of intra-prediction modes.

Another embodiment may have a decoder for decoding a picture from a data stream supporting, for each of different block sizes, a set of intra-prediction modes, configured to decode a predetermined block of the picture by
sorting the set of intra-prediction modes for the block size of the predetermined block according to intra-prediction modes used for neighboring blocks, neighboring the predetermined block, to obtain a list of intra prediction modes,
deriving, for the predetermined block, from the data stream, an index into the list of intra prediction modes,
predicting the predetermined block using an intra prediction mode onto which the index points,
wherein decoder is configured to,
if one of the neighboring blocks is of a different size than the predetermined block, in sorting the assigned set, use a mapping which maps each intra-prediction mode of the set of prediction modes for the one neighboring block's block size onto a representative one in the set of intra-prediction modes for the predetermined block's block size.

According to an embodiment, a method for decoding a picture from a data stream supporting a first set of intra-prediction modes including a plurality of directional prediction modes and at least one of a DC mode and a planar mode, and a second set of intra-prediction mode, may have the steps of:
decoding a predetermined block of the picture by
assigning, based on a first signalization in the data stream, the predetermined block to the first set or the second set,
sorting the assigned set of prediction modes according to intra-prediction modes used for neighboring blocks, neighboring the predetermined block to obtain a list of intra prediction modes,
deriving, for the predetermined block, from the data stream, an index into the list of intra prediction modes,
predicting the predetermined block using an intra prediction mode onto which the index points,
wherein decoding is based on,
if the assigned set is the first set of intra-prediction modes, in sorting the assigned set, use a second mapping which maps each intra-prediction mode of the second set of prediction modes onto a representative one in the first set of intra-prediction modes.

According to another embodiment, a non-transitory digital storage medium may have a computer program stored thereon to perform the inventive method, when said computer program is run by a computer.

Another embodiment may have an encoder for encoding a picture on a data stream supporting a first set of intra-prediction modes including a plurality of directional prediction modes and at least one of a DC mode and a planar mode, and a second set of intra-prediction mode, configured to encode a predetermined block of the picture by assigning, and encoding on a first signalization in the data stream, the predetermined block to the first set or the second set, sorting the assigned set of prediction modes according to intra-prediction modes used for neighboring blocks, neighboring the predetermined block to obtain a list of intra prediction modes, determining, for the predetermined block an index into the list of intra prediction modes, predicting the predetermined block using an intra prediction mode onto which the index points, wherein the encoder is configured to, if the assigned set is the first set of intra-prediction modes, in sorting the assigned set, use a second mapping which maps each intra-prediction mode of the second set of prediction modes onto a representative one in the first set of intra-prediction modes.

Yet another embodiment may have an encoder for encoding a picture onto a data stream supporting, for each of different block sizes, a set of intra-prediction modes, configured to encode a predetermined block of the picture by sorting the set of intra-prediction modes for the block size of the predetermined block according to intra-prediction modes used for neighboring blocks, neighboring the predetermined block to obtain a list of intra prediction modes, inserting, for the predetermined block, into the data stream, an index into the list of intra prediction modes, predicting the predetermined block using an intra prediction mode onto which the index points, wherein encoder is configured to, if one of the neighboring blocks is a different size than the predetermined block, in sorting the assigned set, use a mapping which maps each intra-prediction mode of the set of prediction modes for the one neighboring block's block size onto a representative one in the set of intra-prediction modes for the predetermined block's block size.

According to an embodiment, a method for encoding a picture on a data stream supporting a first set of intra-prediction modes including a plurality of directional prediction modes and at least one of a DC mode and a planar mode, and a second set of intra-prediction mode, may have the steps of:

assigning, and encoding on a first signalization in the data stream, the predetermined block to the first set or the second set, sorting the assigned set of prediction modes according to intra-prediction modes used for neighboring blocks, neighboring the predetermined block to obtain a list of intra prediction modes, determining, for the predetermined block an index into the list of intra prediction modes, predicting the predetermined block using an intra prediction mode onto which the index points, encoding the data stream, wherein the encoder is configured to, if the assigned set is the first set of intra-prediction modes, in sorting the assigned set, use a second mapping which maps each intra-prediction mode of the second set of prediction modes onto a representative one in the first set of intra-prediction modes.

According to an embodiment, a non-transitory digital storage medium may have a computer program stored thereon to perform the inventive method, when said computer program is run by a computer.

According to another embodiment, a method for decoding a picture from a data stream may have the steps of:

mapping a set of P neighboring samples neighboring the predetermined block using a linear or affine linear transformation onto a set of Q predicted values for samples of the predetermined block, wherein the linear or affine linear transformation includes P*Q weighting factors among which at least ¼ P*Q weighting factors are non-zero weighting values, which include, for each of the Q predicted values, a series of P weighting factors relating to the respective predicted value, wherein the series, when being arranged one below the other according to a raster scan order among the samples of the predetermined block, form an envelope which is omnidirectionally non-linear.

According to yet another embodiment, a non-transitory digital storage medium may have a computer program stored thereon to perform the inventive method, when said computer program is run by a computer.

Yet another embodiment may have an encoder for encoding a data stream from a picture, configured to map a set of P neighboring samples neighboring the predetermined block using a linear or affine linear transformation onto a set of Q predicted values for samples of the predetermined block, wherein the linear or affine linear transformation includes P*Q weighting factors among which at least ¼ P*Q weighting factors are non-zero weighting values, which include, for each of the Q predicted values, a series of P weighting factors relating to the respective predicted value, wherein the series, when being arranged one below the other according to a raster scan order among the samples of the predetermined block, form an envelope which is omnidirectionally non-linear.

According to yet another embodiment, a method may have the steps of:

mapping a set of P neighboring samples neighboring the predetermined block using a linear or affine linear transformation onto a set of Q predicted values for samples of the predetermined block, wherein the linear or affine linear transformation includes P*Q weighting factors among which at least ¼ P*Q weighting factors are non-zero weighting values, which include, for each of the Q predicted values, a series of P weighting factors relating to the respective predicted value, wherein the series, when being arranged one below the other according to a raster scan order among the samples of the predetermined block, form an envelope which is omnidirectionally non-linear.

According to yet another embodiment, a non-transitory digital storage medium may have a computer program stored thereon to perform the inventive method, when said computer program is run by a computer.

In accordance to an aspect, there is a decoder disclosed for decoding a picture from a data stream, configured to predict a predetermined block of the picture by mapping a set of P neighboring samples neighboring the predetermined block using a linear or affine linear transformation onto a set of Q predicted values for samples of the predetermined block, wherein the linear or affine linear transformation comprises P*Q weighting factors among which at least ¼ P*Q weighting factors are non-zero weighting values, which comprise, for each of the Q predicted values, a series of P weighting factors relating to the respective predicted value, wherein the series, when being arranged one below the other according to a raster scan order among the samples of the predetermined block, form an envelope which is omnidirectionally non-linear.

The decoder may be such that the P*Q weighting factors are unrelated to each other via any regular mapping rule.

The decoder may be such that a mean of maxima of cross correlations between a first series of weighting factors relating to the respective predicted value, and a second series of weighting factors relating to predicted values other than the respective predicted value, or a reversed version of the latter series, whatever leads to a higher maximum, is lower than a predetermined threshold.

The decoder may be such that the predetermined threshold is 0.3.

The decoder may be such that in the P neighboring samples are located along a one-dimensional path extending along a border of the predetermined block and, for each of the Q predicted values, the series of P weighting factors relating to the respective predicted value are ordered in a manner traversing the one-dimensional path in a predetermined direction.

The decoder may be configured to derive, for the predetermined block, a prediction residual from the data stream in order to obtain for each of the set of Q predicted values a corresponding residual value, and reconstruct the predetermined block by correcting each of the set of Q predicted values by the corresponding residual value to obtain a corresponding reconstructed value so that the corresponding reconstructed value depends on the P neighboring samples strictly linearly.

The decoder may be such that, wherein the decoder is configured to subdivide the picture into a plurality of blocks of different block sizes, which comprise the predetermined block, wherein the decoder supports, for each of a set of block sizes, a first set of intra-prediction modes including a plurality of directional prediction modes and at least one of a DC mode and a planar mode, and a second set of intra-prediction modes, wherein for each of the second set of intra-prediction modes, according to the respective intra-prediction mode, a block of the respective block size is predicted by mapping a set of P neighboring samples neighboring the block of the respective block size using an associated linear or affine linear transformation onto a set of Q predicted values for samples of the block of the respective block, wherein, for each block size of the set of block sizes, the associated linear or affine linear transformations of intra-prediction modes within the second set of intra-prediction modes for the respective block size mutually differ and a cardinality of the second set of intra-prediction modes for the block sizes in the set of block sizes coincide, but the associated linear or affine linear transformations of intra-prediction modes within the second set of intra-prediction modes for different block sizes within the set of block sizes are not transferable onto each other by scaling.

In accordance to an aspect, there is disclosed a method for decoding a picture from a data stream, comprising:

mapping a set of P neighboring samples neighboring the predetermined block using a linear or affine linear transformation onto a set of Q predicted values for samples of the predetermined block, wherein the linear or affine linear transformation comprises P*Q weighting factors among which at least ¼ P*Q weighting factors are non-zero weighting values, which comprise, for each of the Q predicted values, a series of P weighting factors relating to the respective predicted value, wherein the series, when being arranged one below the other according to a raster scan order among the samples of the predetermined block, form an envelope which is omnidirectionally non-linear.

In accordance to an aspect, there is disclosed an encoder for encoding a data stream from a picture, configured to map a set of P neighboring samples neighboring the predetermined block using a linear or affine linear transformation onto a set of Q predicted values for samples of the predetermined block, wherein the linear or affine linear transformation comprises P*Q weighting factors among which at least ¼ P*Q weighting factors are non-zero weighting values, which comprise, for each of the Q predicted values, a series of P weighting factors relating to the respective predicted value, wherein the series, when being arranged one below the other according to a raster scan order among the samples of the predetermined block, form an envelope which is omnidirectionally non-linear.

The encoder may be such that the P*Q weighting factors are unrelated to each other via any regular mapping rule.

The encoder may be such that a mean of maxima of cross correlations between a first series of weighting factors relating to the respective predicted value, and a second series of weighting factors relating to predicted values other than the respective predicted value, or a reversed version of the latter series, whatever leads to a higher maximum, is lower than a predetermined threshold.

The encoder may be configured to use the linear or affine linear transformation for luma component of the predetermined block.

In accordance to an aspect, there is disclosed an encoding method, comprising:

mapping a set of P neighboring samples neighboring the predetermined block using a linear or affine linear transformation onto a set of Q predicted values for samples of the predetermined block, wherein the linear or affine linear transformation comprises P*Q weighting factors among which at least ¼ P*Q weighting factors are non-zero weighting values, which comprise, for each of the Q predicted values, a series of P weighting factors relating to the respective predicted value, wherein the series, when being arranged one below the other according to a raster scan order among the samples of the predetermined block, form an envelope which is omnidirectionally non-linear.

In accordance to an aspect, there is disclosed a decoder for decoding a picture from a data stream supporting a first set of intra-prediction modes including a plurality of directional prediction modes and at least one of a DC mode and a planar mode, and a second set of intra-prediction mode, configured to decode a predetermined block of the picture by
  assigning, based on a first signalization in the data stream, the predetermined block to the first set or the second set,
  sorting the assigned set of intra-prediction modes according to intra-prediction modes used for neighboring blocks, neighboring the predetermined block, to obtain a list of intra prediction modes,
  deriving, for the predetermined block, from the data stream, an index into the list of intra prediction modes,
  predicting the predetermined block using an intra prediction mode onto which the index points,
wherein decoder is configured to,
  if the assigned set is the second set of intra-prediction modes, in sorting the assigned set, use a first mapping which maps each intra-prediction mode of the first set of prediction modes onto a representative one in the second set of intra-prediction modes, and/or
  if the assigned set is the first set of intra-prediction modes, in sorting the assigned set, use a second mapping which maps each intra-prediction mode of the second set of prediction modes onto a representative one in the first set of intra-prediction modes.

In accordance to an aspect, there is disclosed a decoder for decoding a picture from a data stream supporting, for each of different block sizes, a set of intra-prediction modes, configured to
decode a predetermined block of the picture by
  sorting the set of intra-prediction modes for the block size of the predetermined block according to intra-prediction modes used for neighboring blocks, neighboring the predetermined block, to obtain a list of intra prediction modes,
  deriving, for the predetermined block, from the data stream, an index into the list of intra prediction modes,
  predicting the predetermined block using an intra prediction mode onto which the index points,
wherein decoder is configured to,
  if one of the neighboring blocks is of a different size than the predetermined block in sorting the assigned set, use a mapping which maps each intra-prediction mode of the set of prediction modes for the one neighboring block's block size onto a representative one in the set of intra-prediction modes for the predetermined block's block size.

The decoder may be further configured to decode, from the data stream, the index using a variable length code so that a code length monotonically depends on a rank of the intra-prediction mode in the list of intra-prediction modes the index points to.

The decoder may be such that the variable length code is a unary code.

The decoder may be configured to sort the assigned set of intra-prediction modes so that the intra-prediction modes within the assigned set of intra-prediction modes used for the neighboring blocks or being targeted by the intra-prediction modes used for the neighboring blocks via the first or second mapping, are put at a beginning of the list.

The decoder may be configured to sort the set of intra-prediction modes for the block size of the predetermined block so that the intra-prediction modes within the this set of intra-prediction modes used for the neighboring blocks or being targeted by the intra-prediction modes used for the neighboring blocks via the mapping, are put at a beginning of the list.

The decoder may be configured, so that according to each of the second set of intra-prediction modes, the predetermined block is predicted by mapping a set of P neighboring samples neighboring the predetermined block using a linear or affine linear transformation onto a set of Q predicted values for samples of the predetermined block,
wherein, for each of the second set of intra-prediction modes,
the linear or affine linear transformation comprises PQ weighting factors among which at least ¼ PQ weighting factors are non-zero weighting values, which comprise, for each of the Q predicted values, a series of P weighting factors relating to the respective predicted value, wherein the series, when being arranged one below the other according to a raster scan order among the samples of the predetermined block, form an envelope which is omnidirectionally non-linear.

The decoder may be configured so that according to each of the set of intra-prediction modes, the predetermined block is predicted by mapping a set of P neighboring samples neighboring the predetermined block using a linear or affine linear transformation onto a set of Q predicted values for samples of the predetermined block,
wherein, for each of the second set of intra-prediction modes, the linear or affine linear transformation comprises PQ weighting factors among which at least ¼ PQ weighting factors are non-zero weighting values, which comprise, for each of the Q predicted values, a series of P weighting factors relating to the respective predicted value, wherein the series, when being arranged one below the other according to a raster scan order among the samples of the predetermined block, form an envelope which is omnidirectionally non-linear.

The decoder may be such that
the decoder is configured to subdivide the picture into a plurality of blocks of different block sizes, which comprises the predetermined block,
the decoder is configured to support, for each of a set of block sizes, a first set of intra-prediction modes including a plurality of directional prediction modes and at least one of a DC mode and a planar mode, and a second set of intra-prediction modes,
wherein the decoder is configured to,
  if one of the neighboring blocks is of the same block size within the set of block sizes as the predetermined block, but assigned to a different one of the first and second sets of intra-prediction modes, in sorting the assigned set, use the first and second mapping, and
  if one of the neighboring blocks is of a different block size within the set of block sizes from the predetermined block, in sorting the assigned set, use,
    if the assigned set for the predetermined block is the second set for the predetermined block's block size while an assigned set for the one neighboring block is the first set for the one neighboring block's block size, use a third mapping which maps each intra-prediction mode of the first set of prediction modes for the one neighboring block's block size, onto a representative one in the second set of intra-prediction modes for the predetermined block's block size, and/or
    if the assigned set for the predetermined block is the first set for the predetermined block's block size while an assigned set for the one neighboring block is the second set for the one neighboring block's block size, use a fourth mapping which maps each intra-prediction mode of the second set of prediction modes for the one neighboring block's block size, onto a representative one in the first set of intra-prediction modes for the predetermined block's block size, and/or if one of the neighboring blocks is of the same block size within the set of block sizes as the predetermined block, if the assigned set for the predetermined block is the second set for the predetermined block's block size and an assigned set for the one neighboring block is the second set for the one neighboring block's block size, use a fifth mapping which maps each intra-prediction mode of the second set of prediction modes for the one neighboring block's block size, onto a representative one in the second set of intra-prediction modes for the predetermined block's block size.

The decoder may be such that
the decoder is configured to subdivide the picture into a plurality of blocks of different block sizes, which comprises the predetermined block,
the decoder is configured to support, for each of a set of block sizes, a first set of intra-prediction modes including a plurality of directional prediction modes and at least one of a DC mode and a planar mode, and a second set of intra-prediction modes,
wherein decoder is configured to,
    if the predetermined block is non-quadratic, perform the predicting the predetermined block using the intra prediction mode onto which the index points, by
        applying a series of neighboring samples neighboring the predetermined block onto a linear or affine linear transformation associated with the intra prediction mode onto which the index points if the predetermined block is oriented in a first way, and
        applying a reversed version of the series of neighboring samples neighboring the predetermined block onto a linear or affine linear transformation associated with an intra prediction mode of the second set of intra-prediction modes other than the linear or affine linear transformation associated with the intra-prediction mode onto which the index points to obtain a predicted block and subsequently transposing the predicted block if the predetermined block is oriented in a second way, perpendicular to the first way.

The decoder may be configured such that
wherein the second set of intra-prediction modes comprises a first and a second subsets of intra-prediction modes, and the predetermined block is quadratic,
wherein decoder is configured to,
    perform the predicting the predetermined block using the intra prediction mode onto which the index, by
        applying a series of neighboring samples neighboring the predetermined block onto a linear or affine linear transformation associated with the intra prediction mode onto which the index points if the intra prediction mode onto which the index points is comprised by the first subset, and
        applying a reversed version of the series of neighboring samples neighboring the predetermined block onto a linear or affine linear transformation associated with an intra prediction mode of the first subset of intra-prediction modes to obtain a predicted block and subsequently transposing the predicted block if the intra prediction mode onto which the index points is comprised by the second subset.

The decoder may be such that for at least one of the intra-prediction modes of the second set, the prediction using the one intra-prediction mode involves predicting the predetermined block from spatial domain to transform domain or transform domain to transform domain.

Decoder may be configured to use a transformation of the first or second set for the luma component and a transformation of the first set for the chroma component.

Decoder may be configured to map a mode of the second set used for a luma component into a mode of the first set for the luma component.

Decoder may be such that the second mapping maps a plurality of modes of the second set into a single mode of the first set.

Decoder may be such that the second mapping maps all the modes of the second set into a single mode of the first set.

Decoder may be such that the single mode of the first set is the planar mode.

In accordance to an aspect, there is disclosed a method for decoding a picture from a data stream supporting a first set of intra-prediction modes including a plurality of directional prediction modes and at least one of a DC mode and a planar mode, and a second set of intra-prediction mode, the method comprising:
    decoding a predetermined block of the picture by
        assigning, based on a first signalization in the data stream, the predetermined block to the first set or the second set,
        sorting the assigned set of prediction modes according to intra-prediction modes used for neighboring blocks, neighboring the predetermined block to obtain a list of intra prediction modes,
        deriving, for the predetermined block, from the data stream, an index into the list of intra prediction modes,
        predicting the predetermined block using an intra prediction mode onto which the index points,
    wherein decoding is based on,
        if the assigned set is the second set of intra-prediction modes, in sorting the assigned set, use a first mapping which maps each intra-prediction mode of the first set of prediction modes onto a representative one in the second set of intra-prediction modes, and/or
        if the assigned set is the first set of intra-prediction modes, in sorting the assigned set, use a second mapping which maps each intra-prediction mode of the second set of prediction modes onto a representative one in the first set of intra-prediction modes.

In accordance to an aspect, there is disclosed an encoder for encoding a picture on a data stream supporting a first set of intra-prediction modes including a plurality of directional prediction modes and at least one of a DC mode and a planar mode, and a second set of intra-prediction mode, configured to
    encode a predetermined block of the picture by
        assigning, and encoding on a first signalization in the data stream, the predetermined block to the first set or the second set,
        sorting the assigned set of prediction modes according to intra-prediction modes used for neighboring blocks, neighboring the predetermined block to obtain a list of intra prediction modes,
        determining, for the predetermined block, from the data stream, an index into the list of intra prediction modes,
        predicting the predetermined block using an intra prediction mode onto which the index points,
    wherein the encoder is configured to,
        if the assigned set is the second set of intra-prediction modes, in sorting the assigned set, use a first mapping which maps each intra-prediction mode of the first set of prediction modes onto a representative one in the second set of intra-prediction modes, and/or if the assigned set is the first set of intra-prediction modes, in sorting the assigned set, use a second mapping which maps each intra-prediction mode of the second set of prediction modes onto a representative one in the first set of intra-prediction modes.

In accordance to an aspect, there is disclosed an encoder for encoding a picture onto a data stream supporting, for each of different block sizes, a set of intra-prediction modes, configured to encode a predetermined block of the picture by sorting the set of intra-prediction modes for the block size of the predetermined block according to intra-prediction modes used for neighboring blocks, neighboring the predetermined block to obtain a list of intra prediction modes, inserting, for the predetermined block, into the data stream, an index into the list of intra prediction modes, predicting the predetermined block using an intra prediction mode onto which the index points, wherein encoder is configured to, if one of the neighboring blocks is a different size than the predetermined block, in sorting the assigned set, use a mapping which maps each intra-prediction mode of the set of prediction modes for the one neighboring block's block size onto a representative one in the set of intra-prediction modes for the predetermined block's block size.

The encoder may be further configured to encode in the data stream the index using a variable length code so that a code length monotonically depends on a rank of the intra-prediction mode in the list of intra-prediction modes the index points to.

The encoder may be such that the variable length code is a unary code.

The encoder may be configured to sort the prediction modes according to their probability and/or historical data regarding the previous uses for other blocks.

The encoder may be configured to write a second signalization in the data stream with a first symbol continuously repeated up to a second symbol, so as to derive the index in the list on the basis of the length of the symbol repetitions.

The encoder may be configured to sort the assigned set of intra-prediction modes so that the intra-prediction modes within the assigned set of intra-prediction modes used for the neighboring blocks or being targeted by the intra-prediction modes used for the neighboring blocks via the first or second mapping, are put at a beginning of the list.

The encoder may be configured to sort the set of intra-prediction modes for the block size of the predetermined block so that the intra-prediction modes within the this set of intra-prediction modes used for the neighboring blocks or being targeted by the intra-prediction modes used for the neighboring blocks via the mapping, are put at a beginning of the list.

The encoder may be configured so that, according to each of the second set of intra-prediction modes, the predetermined block is predicted by mapping a set of P neighboring samples neighboring the predetermined block using a linear or affine linear transformation onto a set of Q predicted values for samples of the predetermined block, Wherein, for each of the second set of intra-prediction modes, the linear or affine linear transformation comprises PQ weighting factors among which at least ¼ P*Q weighting factors are non-zero weighting values, which comprise, for each of the Q predicted values, a series of P weighting factors relating to the respective predicted value, wherein the series, when being arranged one below the other according to a raster scan order among the samples of the predetermined block, form an envelope which is omnidirectionally non-linear.

The encoder may be configured, so that according to each of the set of intra-prediction modes, the predetermined block is predicted by mapping a set of P neighboring samples neighboring the predetermined block using a linear or affine linear transformation onto a set of Q predicted values for samples of the predetermined block, Wherein, for each of the second set of intra-prediction modes, the linear or affine linear transformation comprises P*Q weighting factors among which at least ¼ P*Q weighting factors are non-zero weighting values, which comprise, for each of the Q predicted values, a series of P weighting factors relating to the respective predicted value, wherein the series, when being arranged one below the other according to a raster scan order among the samples of the predetermined block, form an envelope which is omnidirectionally non-linear.

The encoder may be such that the encoder is configured to subdivide the picture into a plurality of blocks of different block sizes, which comprises the predetermined block, the encoder is configured to support, for each of a set of block sizes, a first set of intra-prediction modes including a plurality of directional prediction modes and at least one of a DC mode and a planar mode, and a second set of intra-prediction modes, wherein the encoder is configured to, if one of the neighboring blocks is of the same block size within the set of block sizes as the predetermined block, but assigned to a different one of the first and second sets of intra-prediction modes, in sorting the assigned set, use the first and second mapping, and if one of the neighboring blocks is of a different block size within the set of block sizes from the predetermined block, (e.g. they are not the same) in sorting the assigned set, use, if the assigned set for the predetermined block is the second set for the predetermined block's block size while an assigned set for the one neighboring block is the first set for the one neighboring block's block size, use a third mapping which maps each intra-prediction mode of the first set of prediction modes for the one neighboring block's block size, onto a representative one in the second set of intra-prediction modes for the predetermined block's block size, and/or, if the assigned set for the predetermined block is the first set for the predetermined block's block size while an assigned set for the one neighboring block is the second set for the one neighboring block's block size, use a fourth mapping which maps each intra-prediction mode of the second set of prediction modes for the one neighboring block's block size, onto a representative one in the first set of intra-prediction modes for the predetermined block's block size, mapping and/or if one of the neighboring blocks is of the same block size within the set of block sizes as the predetermined block, if the assigned set for the predetermined block is the second set for the predetermined block's block size and an assigned set for the one neighboring block is the second set for the one neighboring block's block size,
use a fifth mapping which maps each intra-prediction mode of the second set of prediction modes for the one neighboring block's block size, onto a representative one in the second set of intra-prediction modes for the predetermined block's block size.

The encoder may be such that the encoder is configured to subdivide the picture into a plurality of blocks of different block sizes, which comprises the predetermined block, the encoder is configured to support, for each of a set of block sizes, a first set of intra-prediction modes including a plurality of directional prediction modes and at least one of a DC mode and a planar mode, and a second set of intra-prediction modes, wherein encoder is configured to,
if the predetermined block is non-quadratic, perform the predicting the predetermined block using the intra prediction mode onto which the index points, by
applying a series of neighboring samples neighboring the predetermined block onto a linear or affine linear transformation associated with the intra prediction mode onto which the index points if the predetermined block is oriented in a first way, and
applying a reversed version of the series of neighboring samples neighboring the predetermined block onto a linear or affine linear transformation associated with an intra prediction mode of the second set of intra-prediction modes other than the linear or affine linear transformation associated with the intra-prediction mode onto which the index points to obtain a predicted block and subsequently transposing the predicted block if the predetermined block is oriented in a second way, perpendicular to the first way.

The encoder may be such that the second set of intra-prediction modes comprises a first and a second subsets of intra-prediction modes, and the predetermined block is quadratic wherein the encoder is configured to,
perform the predicting the predetermined block using the intra prediction mode onto which the index points, by
applying a series of neighboring samples neighboring the predetermined block onto a linear or affine linear transformation associated with the intra prediction mode onto which the index points if the intra prediction mode onto which the index points is comprised by the first subset, and
applying a reversed version of the series of neighboring samples neighboring the predetermined block onto a linear or affine linear transformation associated with an intra prediction mode of the second subset of intra-prediction modes to obtain a predicted block and subsequently transposing the predicted block if the intra prediction mode onto which the index points is comprised by the second subset.

The encoder may be such that for at least one of the intra-prediction modes of the second set, the prediction using the one intra-prediction mode involves predicting the predetermined block from spatial domain to transform domain or transform domain to transform domain.

In accordance to an aspect, there is disclosed a method for encoding a picture on a data stream supporting a first set of intra-prediction modes including a plurality of directional prediction modes and at least one of a DC mode and a planar mode, and a second set of intra-prediction mode, comprising assigning, and encoding on a first signalization in the data stream, the predetermined block to the first set or the second set, sorting the assigned set of prediction modes according to intra-prediction modes used for neighboring blocks, neighboring the predetermined block to obtain a list of intra prediction modes, determining, for the predetermined block, from the data stream, an index into the list of intra prediction modes, predicting the predetermined block using an intra prediction mode onto which the index points, encoding the data stream, wherein the encoder is configured to,
if the assigned set is the second set of intra-prediction modes, in sorting the assigned set, use a first mapping which maps each intra-prediction mode of the first set of prediction modes onto a representative one in the second set of intra-prediction modes, and/or
if the assigned set is the first set of intra-prediction modes, in sorting the assigned set, use a second mapping which maps each intra-prediction mode of the second set of prediction modes onto a representative one in the first set of intra-prediction modes.

In accordance to an aspect, there is disclosed a method for decoding a picture from a data stream, configured to predict a predetermined block of the picture by
subjecting a first set of neighboring samples, which neighbor the predetermined block at a first side of the predetermined block, to a transformation [e.g., FFT, DCT . . . ] to obtain a first set of transform coefficients, and/or subjecting a second set of neighboring samples, which neighbor the predetermined block at a second side of the predetermined block, to a transformation to obtain a second set of transform coefficients,
subjecting a combination of the first and second sets of transform coefficients or a combination of the first set of neighboring samples, and the second set of transform coefficients or a combination of the second set of neighboring samples, and the first set of transform coefficients to a linear or affine linear transformation.

Decoder may be configured to
Subdivide the picture into a plurality of blocks of different sizes which includes the predetermined block,
Locate the first and second sets of neighboring samples in a manner independent from sizes of neighboring blocks which include the first and second sets of neighboring samples.

[We do not necessarily take the whole block but only the stripe] Decoder may be configured to
Locate the first and second sets of neighboring samples in a manner so that the first and second sets of neighboring samples are located along a one-dimensional path alongside the first and second sides, respectively, wherein the first and second sets of transform coefficients represent one-dimensional transforms.

Decoder may be configured to form the combination of the first and second sets of transform coefficients by grabbing a first proper subset of the transform coefficients out of the first set of transform coefficients and/or a second proper subset of the transform coefficients out of the second set of transform coefficients so that the combination is independent from a non-grabbed portion of the first and/or second set of transform coefficients, respectively.

Decoder may be configured so that the subjecting the combination of the first and second sets of transform coefficients to the linear or affine linear transformation yields a predictor of the predetermined block in transform domain.

Decoder may be configured so that the subjecting the combination of the first and second sets of transform coefficients to the linear or affine linear transformation yields a predicted value for a proper subset of transform coefficients of a transform of the predetermined block [while e.g. the other are set to zero by default].

Decoder may be configured so that the subjecting the combination of the first and second sets of transform coefficients to the linear or affine linear transformation yields a predictor of the predetermined block in spatial domain. In accordance to an aspect, there is disclosed a method for decoding a picture from a data stream, comprising predicting a predetermined block of the picture by
  subjecting a first set of neighboring samples, which neighbor the predetermined block at a first side of the predetermined block, to a transformation [e.g., FFT, DCT . . . ] to obtain a first set of transform coefficients, and/or subjecting a second set of neighboring samples, which neighbor the predetermined block at a second side of the predetermined block, to a transformation to obtain a second set of transform coefficients,
  subjecting a combination of the first and second sets of transform coefficients or a combination of the first set of neighboring samples, and the second set of transform coefficients or a combination of the second set of neighboring samples, and the first set of transform coefficients to a linear or affine linear transformation. [e.g., we transform each of the portions from the spatial domain to a transform domain and only thereafter we apply the (e.g., linear or affine) transformation].

In accordance to an aspect, there is disclosed an encoder for encoding a picture onto a data stream, configured to predict a predetermined block of the picture by
  subjecting a first set of neighboring samples, which neighbor the predetermined block at a first side of the predetermined block, to a transformation [e.g., FFT, DCT . . . ] to obtain a first set of transform coefficients, and/or subjecting a second set of neighboring samples, which neighbor the predetermined block at a second side of the predetermined block, to a transformation to obtain a second set of transform coefficients,
  subjecting a combination of the first and second sets of transform coefficients or a combination of the first set of neighboring samples, and the second set of transform coefficients or a combination of the second set of neighboring samples, and the first set of transform coefficients to a linear or affine linear transformation. e.g., we transform each of the portions from the spatial domain to a transform domain and only thereafter we apply the (e.g., linear or affine) transformation]

Encoder may be configured to
Subdivide the picture into a plurality of blocks of different sizes which includes the predetermined block,
Locate the first and second sets of neighboring samples in a manner independent from sizes of neighboring blocks which include the first and second sets of neighboring samples.

Encoder may be configured to
Locate the first and second sets of neighboring samples in a manner so that the first and second sets of neighboring samples are located along a one-dimensional path alongside the first and second sides, respectively, wherein the first and second sets of transform coefficients represent one-dimensional transforms.

Encoder may be configured to form the combination of the first and second sets of transform coefficients by grabbing a first proper subset of the transform coefficients out of the first set of transform coefficients and/or a second proper subset of the transform coefficients out of the second set of transform coefficients so that the combination is independent from a non-grabbed portion of the first and/or second set of transform coefficients, respectively.

Encoder may be configured so that the subjecting the combination of the first and second sets of transform coefficients to the linear or affine linear transformation yields a predictor of the predetermined block in transform domain.

Encoder may be configured so that the subjecting the combination of the first and second sets of transform coefficients to the linear or affine linear transformation yields a predicted value for a proper subset of transform coefficients of a transform of the predetermined block.

Encoder may be configured so that the subjecting the combination of the first and second sets of transform coefficients to the linear or affine linear transformation yields a predictor of the predetermined block in spatial domain.

In accordance to an aspect, there is disclosed a method for encoding a picture from a data stream, comprising
predicting a predetermined block of the picture by
  subjecting a first set of neighboring samples, which neighbor the predetermined block at a first side of the predetermined block, to a transformation [e.g., FFT, DCT . . . ] to obtain a first set of transform coefficients, and/or subjecting a second set of neighboring samples, which neighbor the predetermined block at a second side of the predetermined block, to a transformation to obtain a second set of transform coefficients,
  subjecting a combination of the first and second sets of transform coefficients or a combination of the first set of neighboring samples, and the second set of transform coefficients or a combination of the second set of neighboring samples, and the first set of transform coefficients to a linear or affine linear transformation. [e.g., we transform each of the portions from the spatial domain to a transform domain and only thereafter we apply the (e.g., linear or affine) transformation].

BRIEF DESCRIPTION OF THE DRAWINGS

Embodiments of the present invention will be detailed subsequently referring to the appended drawings, in which.

DETAILED DESCRIPTION OF THE INVENTION

Encoders, Decoders According to Examples

In the following, various examples are described which assist in achieving a more effective compression when using intra-prediction. Some examples achieve the compression efficiency increase by spending a set of intra-prediction modes. The latter ones may be added to other intra-prediction modes heuristically designed, for instance, or may be provided exclusively. And even other examples make use of both of the just-discussed specialties.

In order to ease the understanding of the following examples of the present application, the description starts with a presentation of possible encoders and decoders fitting thereto into which the subsequently outlined examples of the present application could be built.

Figure 1:
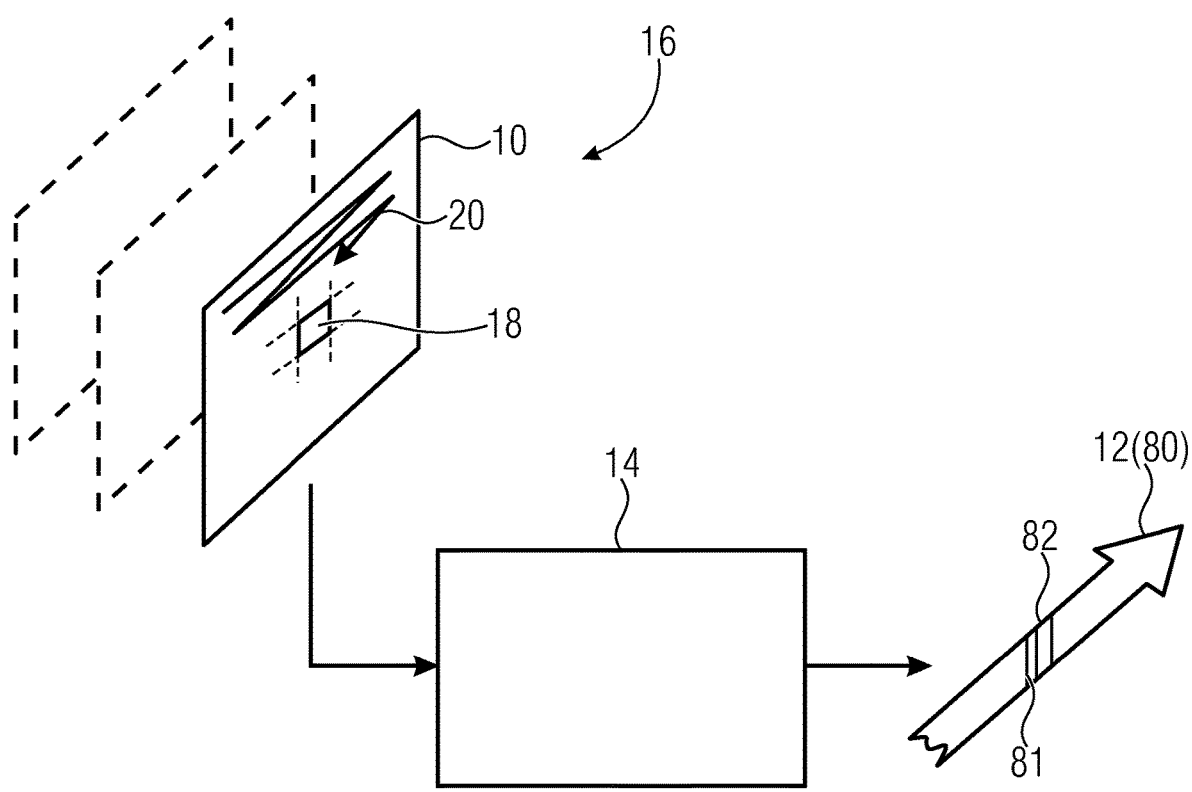
FIGS. 1 and 2 shows apparatus to block-wise encode an image.

FIG. 1 shows an apparatus for block-wise encoding a picture 10 into a datastream 12 (also indicated as 80 in some examples, see below). The apparatus is indicated using reference sign 14 and may be a still picture encoder or a video encoder. In other words, picture 10 may be a current picture out of a video 16 when the encoder 14 is configured to encode video 16 including picture 10 into datastream 12, or encoder 14 may encode picture 10 into datastream 12 exclusively. Examples below may make use of the apparatus 14.

As mentioned, encoder 14 performs the encoding in a block-wise manner or block-base. To this, encoder 14 subdivides picture 10 into blocks, units of which encoder 14 encodes picture 10 into datastream 12. Examples of possible subdivisions of picture 10 into blocks 18 are set out in more detail below. Generally, the subdivision may end-up into blocks 18 of constant size such as an array of blocks arranged in rows and columns or into blocks 18 of different block sizes such as by use of a hierarchical multi-tree subdivisioning with starting the multi-tree subdivisioning from the whole picture area of picture 10 or from a pre-partitioning of picture 10 into an array of tree blocks wherein these examples shall not be treated as excluding other possible ways of subdivisioning picture 10 into blocks 18.

Further, encoder 14 is a predictive encoder configured to predictively encode picture 10 into datastream 12. For a certain block 18 this means that encoder 14 determines a prediction signal for block 18 and encodes the prediction residual, i.e. the prediction error at which the prediction signal deviates from the actual picture content within block 18, into datastream 12.

Encoder 14 may support different prediction modes so as to derive the prediction signal for a certain block 18. The prediction modes, which are of importance in the following examples, are intra-prediction modes according to which the inner of block 18 is predicted spatially from neighboring, already encoded samples of picture 10. The encoding of picture 10 into datastream 12 and, accordingly, the corresponding decoding procedure, may be based on a certain coding order 20 defined among blocks 18. For instance, the coding order 20 may traverse blocks 18 in a raster scan order such as row-wise from top to bottom with traversing each row from left to right, for instance. In case of hierarchical multi-tree based subdivisioning, raster scan ordering may be applied within each hierarchy level, wherein a depth-first traversal order may be applied, i.e. leaf notes within a block of a certain hierarchy level may precede blocks of the same hierarchy level having the same parent block according to coding order 20. Depending on the coding order 20, neighboring, already encoded samples of a block 18 may be located usually at one or more sides of block 18. In case of the examples presented herein, for instance, neighboring, already encoded samples of a block 18 are located to the top of, and to the left of block 18.

Intra-prediction modes may not be the only ones supported by encoder 14. In case of encoder 14 being a video encoder, for instance, encoder 14 may also support intra-prediction modes according to which a block 18 is temporarily predicted from a previously encoded picture of video 16. Such an intra-prediction mode may be a motion-compensated prediction mode according to which a motion vector is signaled for such a block 18 indicating a relative spatial offset of the portion from which the prediction signal of block 18 is to be derived as a copy. Additionally or alternatively, other non-intra-prediction modes may be available as well such as inter-view prediction modes in case of encoder 14 being a multi-view encoder, or non-predictive modes according to which the inner of block 18 is coded as is, i.e. without any prediction.

Figure 2:
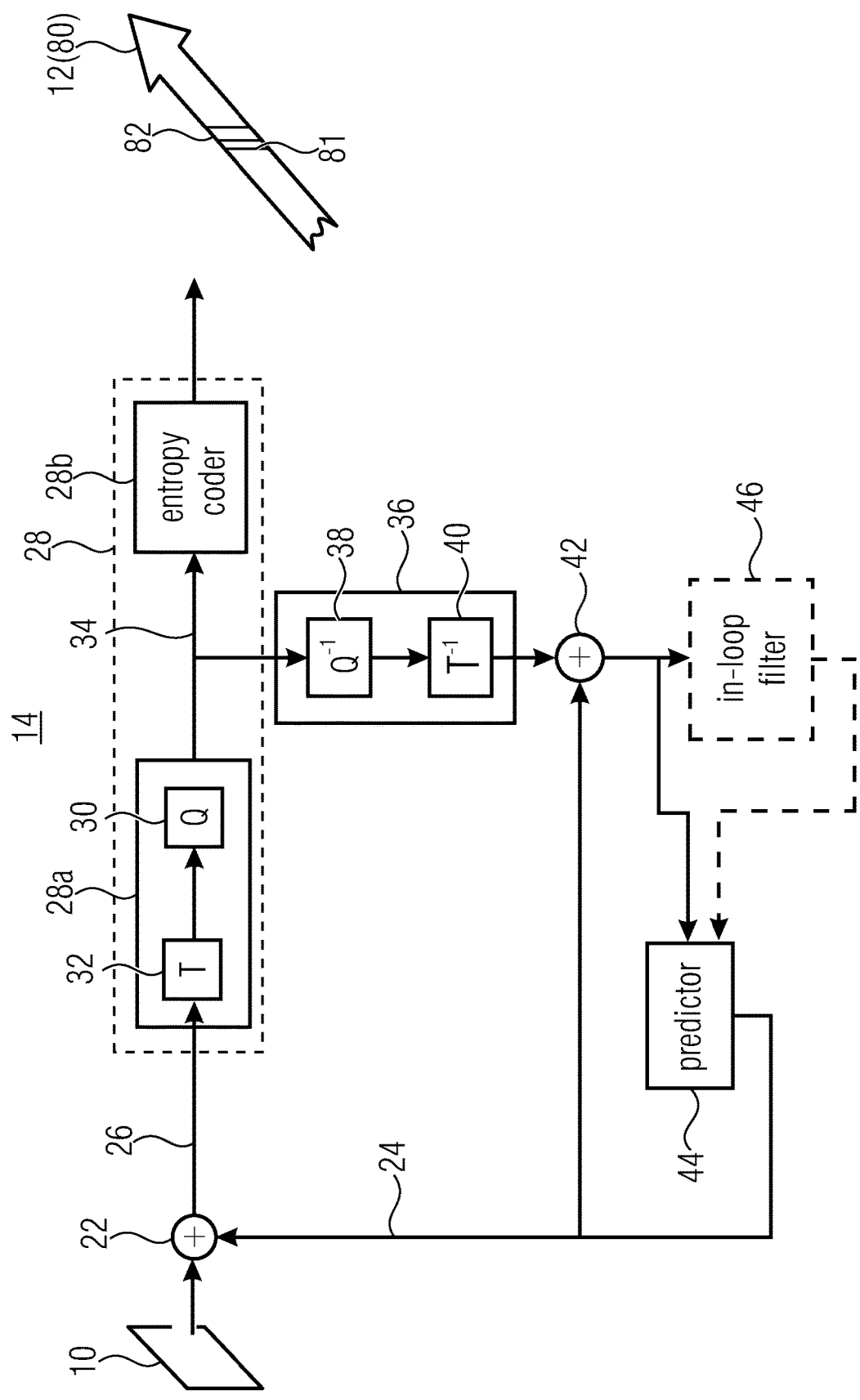

Before starting with focusing the description of the present application onto intra-prediction modes, a more specific example for a possible block-based encoder, i.e. for a possible implementation of encoder 14, as described with respect to FIG. 2 with then presenting two corresponding examples for a decoder fitting to FIGS. 1 and 2, respectively.

FIG. 2 shows a possible implementation of encoder 14 of FIG. 1, namely one where the encoder is configured to use transform coding for encoding the prediction residual although this is nearly an example and the present application is not restricted to that sort of prediction residual coding. According to FIG. 2, encoder 14 (which may be used for examples below) may comprise a subtractor 22 configured to subtract from the inbound signal, i.e. picture 10 or, on a block basis, current block 18, the corresponding prediction signal 24 so as to obtain the prediction residual signal 26 which is then encoded by a prediction residual encoder 28 into a datastream 12. The prediction residual encoder 28 is composed of a lossy encoding stage 28a and a lossless encoding stage 28b. The lossy stage 28a receives the prediction residual signal 26 and comprises a quantizer 30 which quantizes the samples of the prediction residual signal 26. As already mentioned above, the present example uses transform coding of the prediction residual signal 26 and accordingly, the lossy encoding stage 28a comprises a transform stage 32 connected between subtractor 22 and quantizer 30 so as to transform such a spectrally decomposed prediction residual 26 with a quantization of quantizer 30 taking place on the transformed coefficients where presenting the residual signal 26. The transform may be a DCT, DST, FFT, Hadamard transform or the like. The transformed and quantized prediction residual signal 34 is then subject to lossless coding by the lossless encoding stage 28b which is an entropy coder entropy coding quantized prediction residual signal 34 into datastream 12. Encoder 14 further comprises the prediction residual signal reconstruction stage 36 connected to the output of quantizer 30 so as to reconstruct from the transformed and quantized prediction residual signal 34 the prediction residual signal in a manner also available at the decoder, i.e. taking the coding loss is quantizer 30 into account. To this end, the prediction residual reconstruction stage 36 comprises a dequantizer 38 which perform the inverse of the quantization of quantizer 30, followed by an inverse transformer 40 which performs the inverse transformation relative to the transformation performed by transformer 32 such as the inverse of the spectral decomposition such as the inverse to any of the above-mentioned specific transformation examples. Encoder 14 comprises an adder 42 which adds the reconstructed prediction residual signal as output by inverse transformer 40 and the prediction signal 24 so as to output a reconstructed signal, i.e. reconstructed samples. This output is fed into a predictor 44 of encoder 14 which then determines the prediction signal 24 based thereon. It is predictor 44 which supports all the prediction modes already discussed above with respect to FIG. 1. FIG. 2 also illustrates that in case of encoder 14 being a video encoder, encoder 14 may also comprise an in-loop filter 46 with filters completely reconstructed pictures which, after having been filtered, form reference pictures for predictor 44 with respect to inter-predicted block.

As already mentioned above, encoder 14 operates block-based. For the subsequent description, the block bases of interest is the one subdividing picture 10 into blocks for which the intra-prediction mode is selected out of a set or plurality of intra-prediction modes supported by predictor 44 or encoder 14, respectively, and the selected intra-prediction mode performed individually. Other sorts of blocks into which picture 10 is subdivided may, however, exist as well. For instance, the above-mentioned decision whether picture 10 is inter-coded or intra-coded may be done at a granularity or in units of blocks deviating from blocks 18. For instance, the inter/intra mode decision may be performed at a level of coding blocks into which picture 10 is subdivided, and each coding block is subdivided into prediction blocks. Prediction blocks with encoding blocks for which it has been decided that intra-prediction is used, are each subdivided to an intra-prediction mode decision. To this, for each of these prediction blocks, it is decided as to which supported intra-prediction mode should be used for the respective prediction block. These prediction blocks will form blocks 18 which are of interest here. Prediction blocks within coding blocks associated with inter-prediction would be treated differently by predictor 44. They would be inter-predicted from reference pictures by determining a motion vector and copying the prediction signal for this block from a location in the reference picture pointed to by the motion vector. Another block subdivisioning pertains to the subdivisioning into transform blocks at units of which the transformations by transformer 32 and inverse transformer 40 are performed. Transformed blocks may, for instance, be the result of further subdivisioning coding blocks. Naturally, the examples set out herein should not be treated as being limiting and other examples exist as well. For the sake of completeness only, it is noted that the subdivisioning into coding blocks may, for instance, use multi-tree subdivisioning, and prediction blocks and/or transform blocks may be obtained by further subdividing coding blocks using multi-tree subdivisioning, as well.

Figure 3:
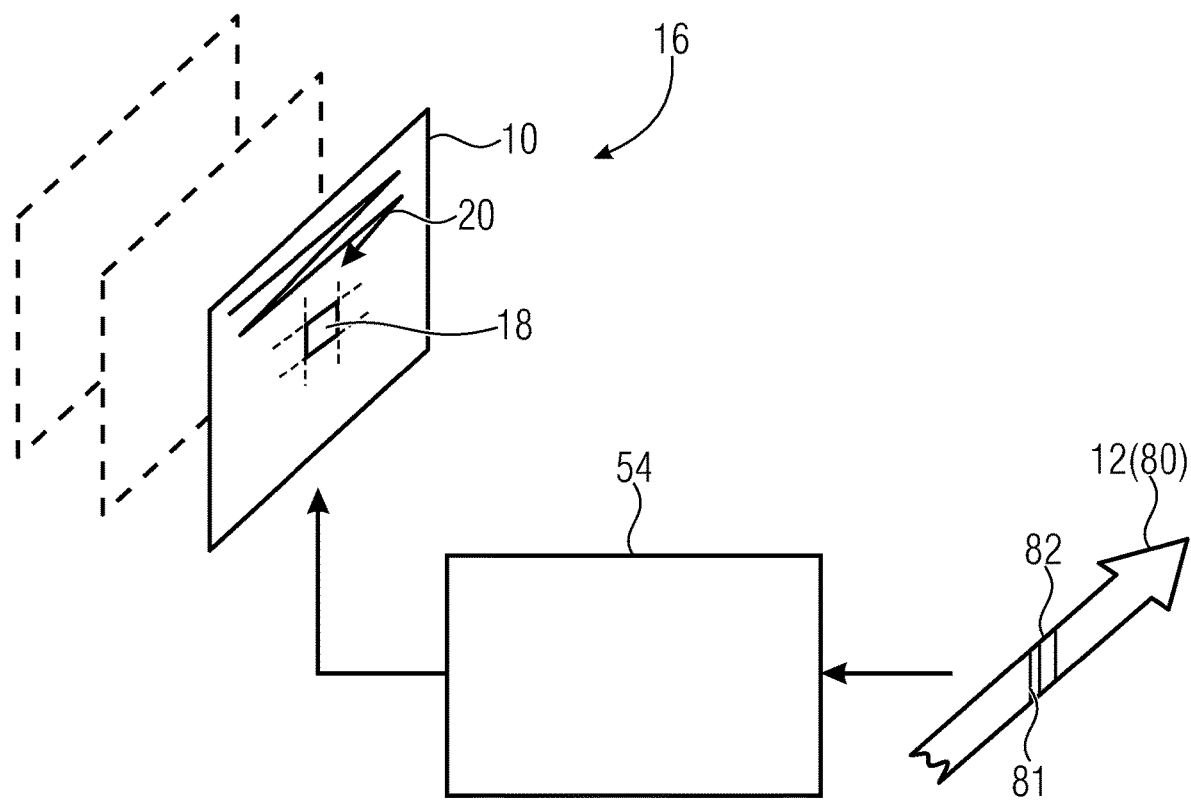
FIGS. 3 and 4 shows apparatus to block-wise decode an image.

A decoder or apparatus (e.g., used in present examples) for block-wise decoding fitting to the encoder 14 of FIG. 1 is depicted in FIG. 3. This decoder 54 does the opposite of encoder 14, i.e. it decodes from datastream 12 picture 10 in a block-wise manner and supports, to this end, a plurality of intra-prediction modes. The decoder 54 may comprise a residual provider 156, for example. All the other possibilities discussed above with respect to FIG. 1 are valid for the decoder 54, too. To this, decoder 54 may be a still picture decoder or a video decoder and all the prediction modes and prediction possibilities are supported by decoder 54 as well. The difference between encoder 14 and decoder 54 lies, primarily, in the fact that encoder 14 chooses or selects coding decisions according to some optimization such as, for instance, in order to minimize some cost function which may depend on coding rate and/or coding distortion. One of these coding options or coding parameters may involve a selection of the intra-prediction mode to be used for a current block 18 among available or supported intra-prediction modes. The selected intra-prediction mode may then be signaled by encoder 14 for current block 18 within datastream 12 with decoder 54 redoing the selection using this signalization in datastream 12 for block 18. Likewise, the subdivisioning of picture 10 into blocks 18 may be subject to optimization within encoder 14 and corresponding subdivision information may be conveyed within datastream 12 with decoder 54 recovering the subdivision of picture 10 into blocks 18 on the basis of the subdivision information. Summarizing the above, decoder 54 may be a predictive decoder operating on a block-bases and besides intra-prediction modes, decoder 54 may support other prediction modes such as inter-prediction modes in case of, for instance, decoder 54 being a video decoder. In decoding, decoder 54 may also use the coding order 20 discussed with respect to FIG. 1 and as this coding order 20 is obeyed both at encoder 14 and decoder 54, the same neighboring samples are available for a current block 18 both at encoder 14 and decoder 54. Accordingly, in order to avoid unnecessary repetition, the description of the mode of operation of encoder 14 shall also apply to decoder 54 as far the subdivision of picture 10 into blocks is concerned, for instance, as far as prediction is concerned and as far as the coding of the prediction residual is concerned. Differences lie in the fact that encoder 14 chooses, by optimization, some coding options or coding parameters and signals within, or inserts into, datastream 12 the coding parameters which are then derived from the datastream 12 by decoder 54 so as to redo the prediction, subdivision and so forth.

Figure 4:
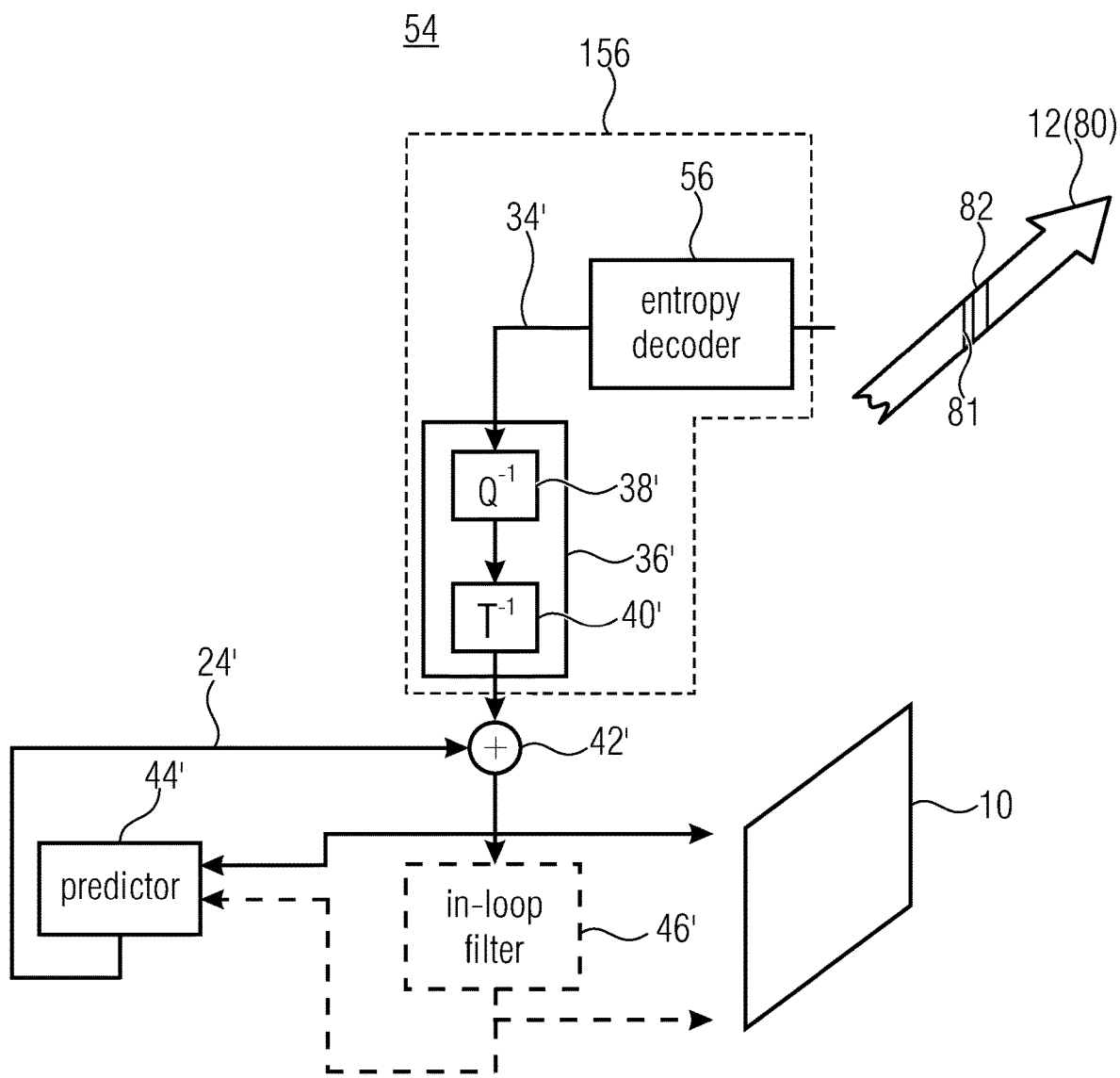

FIG. 4 shows a possible implementation of the decoder 54 of FIG. 3 (e.g., used in present examples), namely one fitting to the implementation of encoder 14 of FIG. 1 as shown in FIG. 2. As many elements of the encoder 54 of FIG. 4 are the same as those occurring in the corresponding encoder of FIG. 2, the same reference signs, provided with an apostrophe, are used in FIG. 4 in order to indicate these elements. In particular, adder 42', optional in-loop filter 46' and predictor 44' are connected into a prediction loop in the same manner that they are in encoder of FIG. 2. The reconstructed, i.e. dequantized and retransformed prediction residual signal applied to added 42' is derived by a sequence of entropy decoder 56 which inverses the entropy encoding of entropy encoder 28b, followed by the residual signal reconstruction stage 36' which is composed of dequantizer 38' and inverse transformer 40' just as it is the case on encoding side. The decoder's output is the reconstruction of picture 10. The reconstruction of picture 10 may be available directly at the output of adder 42' or, alternatively, at the output of in-loop filter 46'. Some post-filter may be arranged at the decoder's output in order to subject the reconstruction of picture 10 to some post-filtering in order to improve the picture quality, but this option is not depicted in FIG. 4.

Again, with respect to FIG. 4 the description brought forward above with respect to FIG. 2 shall be valid for FIG. 4 as well with the exception that merely the encoder performs the optimization tasks and the associated decisions with respect to coding options. However, all the description with respect to block-subdivisioning, prediction, dequantization and retransforming is also valid for the decoder 54 of FIG. 4.

Examples

In some examples above and below, the encoder and/or decoder may be so as to reconstruct the predetermined block (18) by correcting each of the set of Q predicted values by the corresponding residual value to obtain a corresponding reconstructed value so that the corresponding reconstructed value (24') depends on the P neighboring samples (template) strictly linearly (except for, optionally, a clipping applied after prediction correction).

In some cases, it is possible to refer to a "set of block sizes", which includes the different sizes that may be used For example, a size M×N is a size different from M×N of M×$N_1$ if N≠$N_1$. Some modes are only directed to a particular block size (which is one of the block sizes of the set of block sizes).

Further, reference is made to a "first set 121 of conventional modes", which contains conventional modes. Reference is also made to a "second set 122 of ALWIP modes", which contains the ALWIP mode(s) (examples of ALWIP are provided below).

The present document is concerned, inter alia, with an improved intra-prediction mode concept for block-wise picture coding such as usable in a video codec such as HEVC or any successor of HEVC.

Intra-prediction modes are widely used in picture and video coding. In video coding, intra-prediction modes compete with other prediction modes such as inter-prediction modes such as motion-compensated prediction modes. In intra-prediction modes, a current block is predicted on the basis of neighboring samples, i.e. samples already encoded as far as the encoder side is concerned, and already decoded as far as the decoder side is concerned. Neighboring sample values are extrapolated into the current block so as to form a prediction signal for the current block with the prediction residual being transmitted in the datastream for the current block. The better the prediction signal is, the lower the prediction residual is and, accordingly, a lower number of bits may be used to code the prediction residual.

In order to be effective, several aspects should be taken into account in order to form an effective frame work for intra-prediction in a block-wise picture coding environment. For instance, the larger the number of intra-prediction modes supported by the codec, the larger the side information rate consumption is in order to signal the selection to the decoder. On the other hand, the set of supported intra-prediction modes should be able to provide a good prediction signal, i.e. a prediction signal resulting in a low prediction residual.

There is disclosed apparatus and methods for block-wise decoding (or encoding) a picture (e.g., 10) from a data stream (e.g., 12, 80), the apparatus and the methods supporting at least one intra-prediction mode according to which the intra-prediction signal for a block of a predetermined size of the picture is determined by applying a first template of samples which neighbors the current block onto an affine linear predictor which, in the sequel, shall be called Affine Linear Weighted Intra Predictor (ALWIP).

The apparatus and methods may have at least one of the properties discussed below.
Examples of Predictors Complementary to Other Predictors The intra-prediction modes supported by the present apparatus and methods may, in some examples, be complementary to other intra prediction modes of the codec. They may be complementary to the DC-, Planar-, or Angular-Prediction modes defined in the HEVC codec resp. the JEM reference software. The latter three types of intra-prediction modes shall be called "conventional intra prediction modes" here. Thus, for a given block in intra mode, a flag (e.g. encoded in the field subsequently indicated with "81") may be parsed by the decoder which indicates whether one of the intra-prediction modes supported by the apparatus or method is to be used or not.

More than One Proposed Prediction Modes

The apparatus and methods may contain more than one ALWIP mode, e.g., stored in storage units (or in some cases, they may be obtained on-the-fly). Thus, in case that the decoder knows that one of the ALWIP modes supported by the encoder apparatus is to be used, the decoder may parse additional information (e.g., encoded in the field subsequently indicated with "82") that may indicate which of the ALWIP modes supported by the apparatus of method is to be used.

The signalization of the mode supported may have the property that the coding of some ALWIP modes may involve less bins than other ALWIP modes. Which of these modes involve less bins and which modes involve more bins may either depend on information that can be extracted from the already decoded bitstream 12 (or 80) or may be fixed in advance.

Sharing Predictors Between Different Block Sizes Using Downsampling/Upsampling

Some examples discussed here may be exemplified in particular by taking into consideration examples of FIG. 13 (see also the discussion below).

In some cases, an encoder or decoder may perform transformations between predictors of different block sizes, e.g. by downsampling and/or upsampling. This may happen when an ALWIP mode is provided for a particular size (e.g., M×N), while a block (e.g., 18 or $B_1$) to be predicted has dimension $M_1$×$N_1$ different from M×N (e.g., at least one of M and N is such that M≠$M_1$ and or N≠$N_1$). Hereinbelow, the "second template 1160" may refer to a group of already-predicted neighboring samples (also indicated with 17'a, 17'b, 17'c, see below) used for performing the intra prediction, associated to a block size for which no ALWIP mode is at disposal of the encoder or decoder. The "first template 1161" may refer to a template with the dimensions that may be used for a prediction associated to a block size for which an ALWIP mode is actually at disposal of the encoder or decoder. Examples are here discussed which permit to "jump" from the second template 1160 to the first template 1161, to subsequently perform the prediction using the first template 1161, and to finally return to the original block size after having predicted the block 18 ($B_1$).

Figure 13:
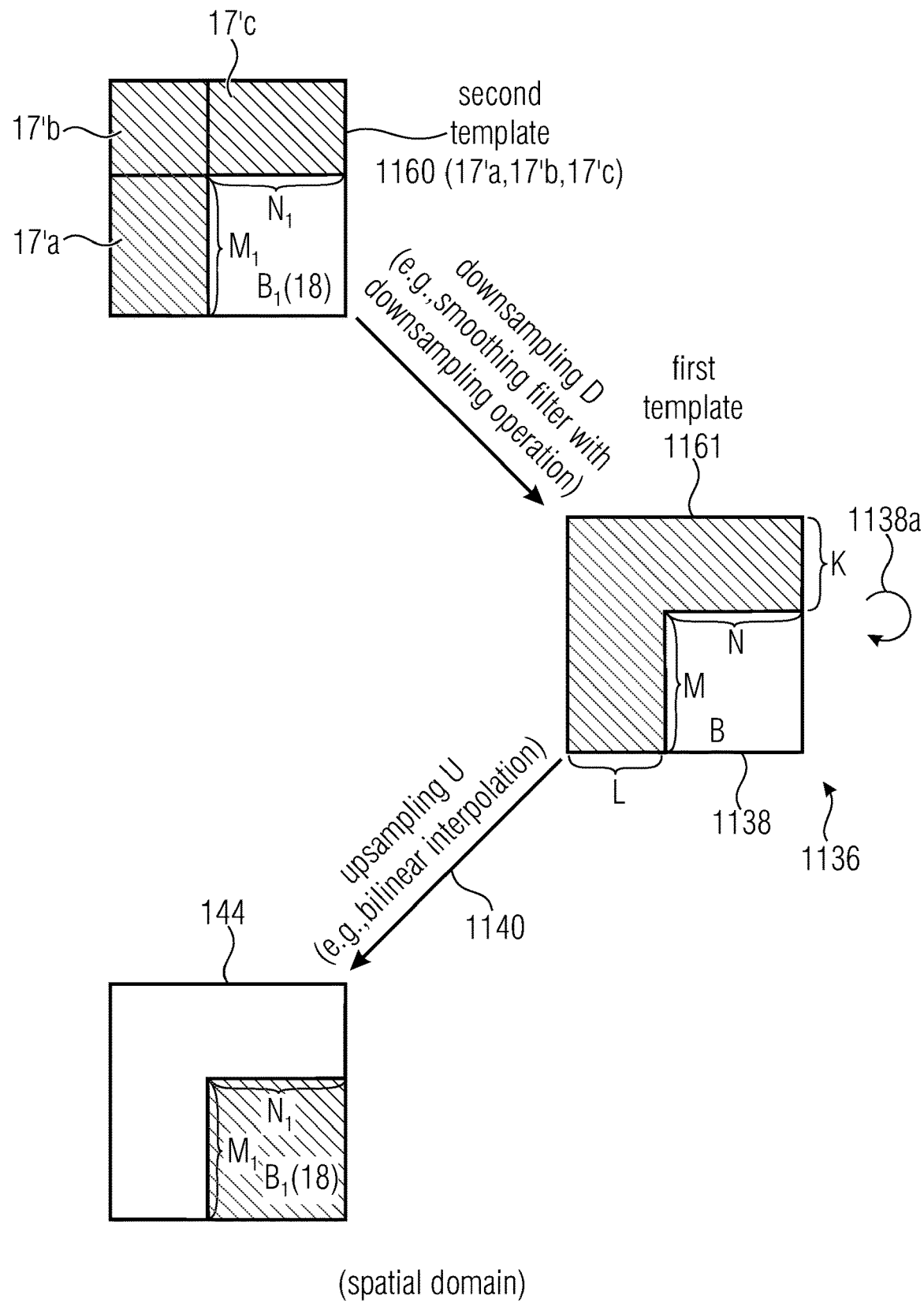

With reference to FIG. 13, the apparatus and methods may be configured, for a current block 18 ($B_1$) differing from a predetermined size for which an ALWIP mode is provided to the decoder (or encoder), to:

- resample the second template (1160) of samples (17'a, 17'b, 17'c) neighboring the current block ($B_1$, 18), so as to conform with the first template (1161), so as to obtain a resampled template (1136);
- apply the resampled template (1161) onto an ALWIP predictor (1138a) so as to obtain a preliminary intra-prediction; and
- resample (1140) the preliminary intra-prediction signal so as to conform with the current block so as to obtain the intra-prediction signal for the current block (18).

The apparatus may be configured to resample by downsampling (D) the second template (1160) to obtain the first template (1161).

The apparatus may be configured to resample the preliminary intra-prediction signal by upsampling the preliminary intra-prediction signal. The apparatus may be configured to transform the preliminary intra-prediction signal from a spatial domain into a transform domain; and resample the preliminary intra-prediction signal in the transform domain. The apparatus may be configured to resample the transform-domain preliminary intra-prediction signal by scaling the coefficients of the preliminary intra-prediction signal.

Apparatus or methods may be configured, in some examples, to
resample a transform-domain preliminary intra-prediction signal by:
increasing the dimensions of the intra-prediction signal to conform to the dimensions of the current block; and
zero-padding the coefficients of added coefficients of the preliminary intra-prediction signal, the added coefficients relating to higher-frequencies bins.

The apparatus may be configured to compose the transform-domain preliminary intra-prediction signal with a dequantized version of a prediction residual signal. The apparatus may be configured to resample the preliminary intra-prediction signal in the spatial domain.

The apparatus may be configured to resample the preliminary intra-prediction signal by performing a bilinear interpolation. The apparatus may be configured to encode in a data field information regarding the resampling and/or the use of affine linear predictors for different dimensions.

In some cases, it is possible to us a mapping which maps a mode which might be used for the $M_1 \times N_1$ block 18 ($B_1$) into the mode 1138a.

The present example has been explained for ALWIP modes, but it may also be implemented for conventional modes or for other kinds of modes.

Prediction into the Transform Domain

As will be apparent in subsequent passages (see also FIG. 12), it is possible to perform the intra prediction in the spatial domain and/or in the transform domain. Hereinafter there are some considerations according to an encoder apparatus and/or decoder apparatus in the transform domain.

There is also disclosed an apparatus for block-wise decoding a picture from a data stream, the apparatus supporting at least one intra-prediction mode according to which the intra-prediction signal for a current block of the picture is determined by:
applying a first set of neighboring samples of the current block onto a ALWIP to obtain a prediction of a set of transform coefficients of a transform of the current block.

One of the apparatus may be configured to inversely transform the prediction to obtain a reconstructed signal. One of the apparatus may be configured to decode from the data stream an index using a variable length code; and perform the selection using the index. One of the apparatus may be configured to determine a ranking of the set of intra prediction modes; and, subsequently, resample the second template.

There is disclosed a method comprising:
resampling a second template of samples neighboring the current block, so as to conform with a first template so as to obtain a resampled template,
applying the resampled template of samples onto a ALWIP so as to obtain a preliminary intra-prediction signal, and
resampling the preliminary intra-prediction signal so as to conform with the current block so as to obtain the intra-prediction signal for the current block.

There is disclosed a method for block-wise decoding a picture from a data stream, comprising:
applying a first set of neighboring samples of a current block onto an ALWIP to obtain a prediction of a set of transform coefficients of a transform of a current block.

A method of above and/or below may use the equipment comprising at least one apparatus as above and/or below.

If the proposed predictor predicts transform coefficients, the transform coefficients not predicted may be inferred to be zero. Which transform coefficients are to be predicted may depend only on the given mode, not on the input (e.g., not on the neighboring blocks). Additionally, it might be fixed in advanced that for the given transform all high frequency components of the prediction signal starting at a certain point are inferred to be zero.

In examples, there may be defined a mapping which maps a mode into another mode for which the resampling has to be performed.

Examples above are mainly discussed for ALWIP modes, but they may be generalized to conventional modes and other kinds of modes.

Prediction from the Transform Domain

Some prediction modes of the present application might be configured to first apply a transform which has an energy compaction property on natural images (e.g. a Discrete Cosine Transform, DCT, or a Wavelet Transform) and to use only some of the resulting transform coefficients as an input for the affine linear prediction supported by the apparatus. The coefficients to be used might be either fixed in advanced (e.g., only low frequency coefficients) or might be derived from the transformed signal itself (e.g., only the frequency coefficients with the largest amplitude).

If it is fixed in advanced which frequency coefficients are to be used, then only a partial transform might be applied to the input signal, for example a Discrete Cosine Transform computing only low frequency coefficients or one or several stages of a Low-Pass-Filtering corresponding to a given Wavelet-Transform.

Transposing Proposed Prediction Modes

The example here discussed will be described in detail subsequently, with particular reference to FIGS. 11a and 11b.

For a given block 18 with N rows and M columns, an ALWIP mode already supported by the apparatus for that block and a given block with M rows and N columns, the apparatus may be configured to support a new prediction mode on the block with M rows and N columns by: First, mapping a template consisting of neighboring, already reconstructed samples for the block with M rows and N columns to a template that serves as an input for the affine-linear intra-prediction on the block with N rows and M columns. Second, applying the ALWIP mode on the block with N rows and M columns. Third, transposing the result of the latter prediction so that it becomes a prediction signal on the block with M rows and N columns. It is pointed out that M and N might be equal.

Here, to explain the first step further, if for example the template consisting of neighboring, already reconstructed samples for the block with M rows and N columns consists of k rows above the block and I columns left of the block and if the template that serves as an input for the affine-linear prediction on the block with N rows and M columns consists of I rows above the block and k columns left of the block, then the p-th row above the block with M rows and N columns might be mapped to the p-th column left of the block with N rows and M columns and the q-th column left of the block with M rows and N columns might be mapped to the q-th row above the block with N rows and M columns.

There is the possibility of performing mapping operations, e.g. from a mode which would be applicable to the M×N block to an associated mode which is applicable to the N×M block.

Examples above have mainly been referred to ALWIP modes, even though they may be also valid for conventional modes and/or other modes.

Mapping Between Mode-Indices

For a given block shape and for an ALWIP intra-prediction for that block shape which are part of the proposed apparatus and methods, there may be a mapping that maps each ALWIP mode to a conventional intra prediction mode (DC-, Planar- or Angular) which are present in the underlying codec (and vice versa, in examples).

This mapping might be used in the signalization scheme of the conventional intra-prediction modes which is present in the underlying codec. Namely, if at the decoder a list is generated, which performs a ranking among the conventional intra-prediction modes and if this list is used in their signalization and if the generation of the latter list is realized by a fixed rule using the conventional intra-prediction modes of surrounding, already reconstructed, blocks, then this rule is extended to also include surrounding, already reconstructed blocks which use one of the ALWIP modes proposed in the underlying apparatus by first applying the mapping to each of these modes and then treating them as conventional intra prediction modes in the generation of the list.

Moreover, this mapping might additionally be used as follows: if the luma-prediction signal is generated using one of the ALWIP modes for that block shape, the chroma prediction signal can be obtained by using the conventional intra prediction mode corresponding to the ALWIP via the mapping.

For a given block shape and given ALWIP mode for that block shape which are part of the proposed apparatus, there may be a mapping that maps each of the conventional intra-prediction modes that are present in the underlying codec to an ALWIP mode for that block-shape which is part of the proposed apparatus.

For a given first block shape and for given ALWIP intra-prediction modes for the first block shape which are part of the proposed apparatus and for a given second block shape and given ALWIP intra-prediction modes for the second block shape which are part of the proposed apparatus, there may be a mapping which maps each ALWIP mode for the first block shape to an ALWIP for the second block-shape.

This mapping may be realized as first applying the mapping described in above paragraph of the present section and then applying the mapping of the second paragraph of the present section to the result (or vice versa). The last two mappings just described might both be used to generate a ranking of all available ALWIP modes on a given block using the intra-prediction modes of neighboring blocks which might be either conventional intra prediction modes or ALWIP modes: One first applies the mapping to each of the neighboring intra prediction modes which gives a set of ALWIP modes corresponding to the shape of the given block. Then, by a predefined rule, one ranks all possible ALWIP modes; ALWIP modes that occur in the set corresponding to the surrounding blocks may be ranked differently than other ALWIP modes.

The latter ranking might be used in the signalization of the ALWIP mode by coding the ALWIP mode with different numbers of bins corresponding to that ranking.

Description of Aspects of Examples Regarding ALWIP Transformations

FIG. 2 shows the decoder 54 for decoding a picture from a data stream 12. The decoder 54 may be configured to decode a predetermined block 18 of the picture. In particular, the predictor 44 may be configured for mapping a set of P neighboring samples neighboring the predetermined block 18 using a linear or affine linear transformation [e.g., ALWIP] onto a set of Q predicted values for samples of the predetermined block.

Figure 5:
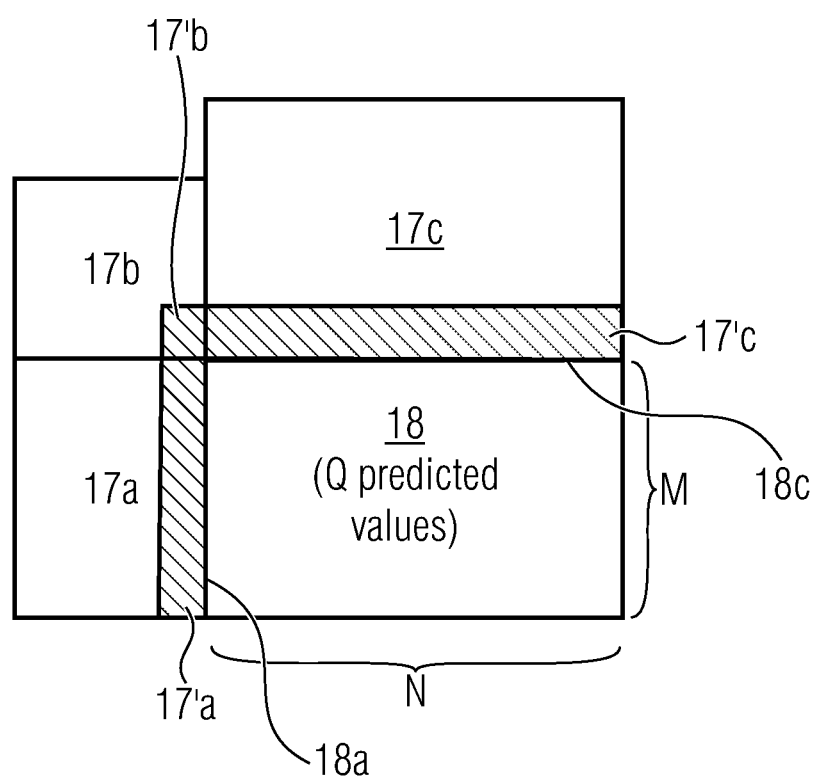
FIG. 5 shows a predetermined block to be predicted.

As shown in FIG. 5, a predetermined block 18 comprises Q values to be predicted (which, at the end of the operations, will be "predicted values"). If the block 18 has M rows and N columns, the values to be predicted amount to Q=M*N values. The Q values of the block 18 may be in the spatial domain (e.g., pixels) or in the transform domain (e.g., DCT, etc.). The Q values of the block 18 may be predicted on the basis of P values taken from the neighboring blocks 17a-17c, which are adjacent to the block 18. The P values of the neighboring blocks 17a-17c may be in the closest positions (e.g., adjacent) to the block 18. The P values of the neighboring blocks 17a-17c have already been processed and predicted. The P values are indicated as values in portions 17'a-17'c (forming a so called "template"), to distinguish them from the blocks they are part of (in some examples, 17'b is not used).

Figure 6:
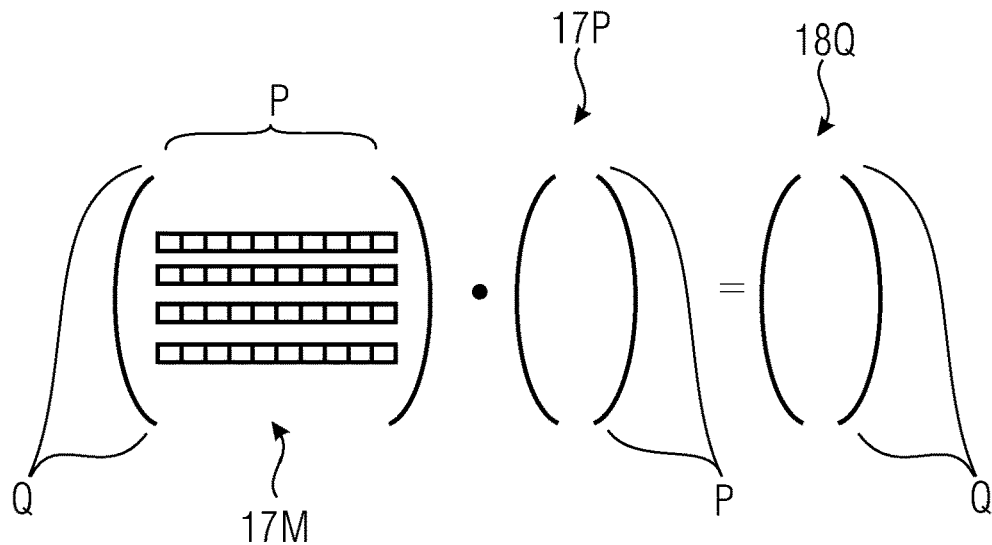
FIG. 6 shows a prediction operation.

As shown in FIG. 6, in order to perform the prediction, we may operate with a first vector 17P with P entries (each entry being a particular position in the neighboring portions 17'a-17'c), a second vector 18Q with Q entries (each entry being a particular position in the block 18), and a mapping matrix 17M (each row being associated to a particular position in the block 18, each column being associated to a particular position in the neighboring portions 17'a-17'c). The mapping matrix 17M therefore performs the prediction of the P values of the neighboring portions 17'a-17'c (template) into values of the block 18 according to a predetermined mode. The entries in the mapping matrix 17M are therefore weighting factors. The matrix 17M (which may be associated to a conventional mode or to an ALWIP mode) may be pre-defined and stored in a storage unit (e.g., register, memory, etc.) of the decoder and/or encoder, or may be obtained on-the-fly. The matrix 17M (and the associated mode, as well) is in general associated to a particular size. E.g., a size M×N is in general not the same of $M_1 \times N_1$ (with $M \neq M_1$ and/or $N \neq N_1$), and a mode associated to a size M×N is in general different from the mode associated to the size $M_1 \times N_1$, and the matrix 17M for the mode associated to a size M×N is in general different from the matrix 17M for the mode associated to the size $M_1 \times N_1$. For a mode associated to a size M×N, the matrix 17M will have Q rows, where Q=M*N. For a mode associated to a size $M_1 \times N_1$, the matrix 17M will have $Q_1$ rows, where $Q_1 = M_1 * N_1$.

In the art there are known several conventional modes, such as DC mode, planar mode and 65 directional prediction modes. There may be known, for example, 67 modes. See below for a discussion on the conventional modes.

However, it has been noted that it is also possible to make use of different modes (apart from the conventional ones). The different, additional modes that are here presented are here called linear or affine linear transformations. The linear or affine linear transformation (associated to the matrix 17M) comprises P*Q weighting factors, among which at least ¼ P*Q weighting factors are non-zero weighting values, which comprise, for each of the Q predicted values, a series of P weighting factors relating to the respective predicted value. The series, when being arranged one below the other according to a raster scan order among the samples of the predetermined block 18, form an envelope which is omnidirectionally non-linear.

Figure 7:
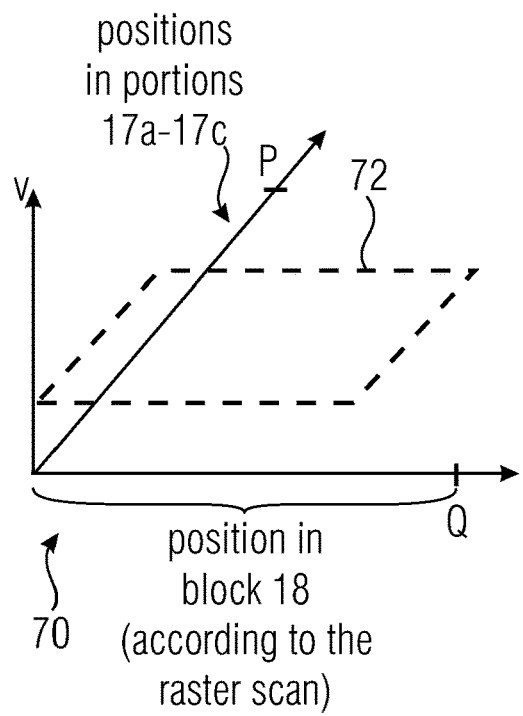
FIG. 7 shows a diagram illustrating a conventional prediction.

FIG. 7 shows an example of a diagram 70 mapping the P positions of the neighboring values 17'a-17'c (template), the Q positions of the blocks 17'a-17'c, and at the values of the P*Q weighting factors of the matrix 17M. A plane 72 is the envelope of the series for a DC transformation (which is a plane for the DC transformation). The envelope is evidently planar and therefore is excluded by the definition of the linear or affine linear transformation (ALWIP). The planar mode and the 65 directional prediction modes would have different envelopes, which would however omnidirectionally linear. To the contrary, the envelope of the linear or affine linear transformation will not be omnidirectionally linear. It has been understood that such kind of transformation may be optimal, in some situations, for performing the prediction for the block 18. It has been noted that it is advantageous that at least ¼ of the weighting factors are different from zero (i.e., at least the 25% of the P*Q weighting factors are different from 0). The weighting factors may be unrelated with each other according to any regular mapping rule. Hence, a matrix 17M may be such that the values of its entries have no apparent recognizable relationship.

In examples, an ALWIP transformation is such that a mean of maxima of cross correlations between a first series of weighting factors relating to the respective predicted value, and a second series of weighting factors relating to predicted values other than the respective predicted value, or a reversed version of the latter series, whatever leads to a higher maximum, may be lower than a predetermined threshold (e.g., 0.2 or 0.3 or 0.35 or 0.1, e.g., a threshold in a range between 0.05 and 0.035).

The P neighboring samples (17'a-17'c) of blocks 17a-17c may be located along a one-dimensional path extending along a border (e.g., 18c, 18a) of the predetermined block 18. For each of the Q predicted values of the predetermined block 18, the series of P weighting factors relating to the respective predicted value may be ordered in a manner traversing the one-dimensional path in a predetermined direction (e.g., from left to right, from top to down, etc.).

In examples, the ALWIP matrix 17M may be non-diagonal or non-block diagonal.

An example of ALWIP matrix 17M for predicting a 4×4 block 18 from 4 already predicted neighboring samples may be:

{
{ 37, 59, 77, 28}, { 32, 92, 85, 25}, { 31, 69, 100, 24}, { 33, 36, 106, 29},
{ 24, 49, 104, 48}, { 24, 21, 94, 59}, { 29, 0, 80, 72}, { 35, 2, 66, 84},
{ 32, 13, 35, 99}, { 39, 11, 34, 103}, { 45, 21, 34, 106}, { 51, 24, 40, 105},
{ 50, 28, 43, 101}, { 56, 32, 49, 101}, { 61, 31, 53, 102}, { 61, 32, 54, 100}
}.

(Here, {37, 59, 77, 28} is the first row; {32, 92, 85, 25} is the second row; and {61, 32, 54, 100} is the 16$^{th}$ row of the matrix 17M.) Matrix 17M has dimension 16×4 and includes 64 weighting factors (as a consequence of 16*4=64). This is because matrix 17M has dimension Q×P, where Q=M*N, which is the number of samples of the block 18 to be predicted (block 18 is a 4×4 block), and P is the number of samples of the already predicted samples (e.g., 17'a-17'c). Here, M=4, N=4, Q=16 (as a consequence of M*N=4*4=16), P=4. The matrix is non-diagonal and non-block diagonal, and is not described by a particular rule.

As can be seen, less than ¼ of the weighting factors are 0 (in this case, one weighting factor out of sixty-four is zero). The envelope formed by these values, when arranged one below the other one according to a raster scan order, form an envelope which is omnidirectionally non-linear.

Even if the explanation above is directed to a decoder, the same may be performed at the encoder (e.g., encoder 14).

In some examples, for each block size (in the set of block sizes), the ALWIP transformations of intra-prediction modes within the second set 122 of intra-prediction modes for the respective block size are mutually different. In addition or in alternative, a cardinality of the second set 122 of intra-prediction modes for the block sizes in the set of block sizes may coincide, but the associated linear or affine linear transformations of intra-prediction modes within the second set of intra-prediction modes for different block sizes may be non-transferable onto each other by scaling.

In some examples the ALWIP transformations may be defined in such a way that they have "nothing to share" with conventional transformations (e.g., the ALWIP transformations may have "nothing" to share with the corresponding conventional transformations, even though they have been mapped via one of the mappings above).

In examples, ALWIP modes are used for luma components, but they may be avoided for chroma components.

Here below, reference is mainly made to:
a first set 121 of conventional intra-prediction modes including a plurality of directional prediction modes and at least one of a DC mode and a planar mode (the set may have 67 modes, for example); and
a second 122 set of intra-prediction modes (e.g., linear or affine prediction modes, ALWIP, as discussed above).

Signaling, Mapping

It is here explained how to reduce the size of a bitstream (e.g., 12, 80) encoding a signaling the prediction mode to be chosen, for example, using a unary variable length code or another variable length code.

The choice may be made by the encoder which encodes, in the bitstream, a variable-length code (which may be unary) of the type "000 . . . 1", wherein the "1" is positioned after a sequence of "0" s. (More in general, more frequent intra prediction modes are given a cheaper code, even if not necessarily unary.) The shortest field may therefore be "1" (which indicates a first prediction mode); the second shortest field may be "01" (which indicates a second prediction mode); etc. (a string with 66 "0"s and one "1" in the 66$^{th}$ position could indicate a last of 67 prediction modes, for example). As this code may be signaled for each block of a multitude of blocks to be predicted, it is in general advantageous that the field is short for each block (i.e., that the modes to be used are indicated by a short string, such as "1", "01", "001", and so on), while avoiding fields with tens of "0"s. A strategy based on rankings among modes has therefore been developed. According to such a strategy, the length of the code depends monotonically on a rank of the intra-prediction mode in a list of intra-prediction mode, so as to recognize an index pointing at a particular prediction mode in the list. The list may be understood as a list of most probable modes and may be construed by rules which are common to the encoder and the decoder, even though the list is not directly signaled by the encoder to the decoder.

Figure 8:
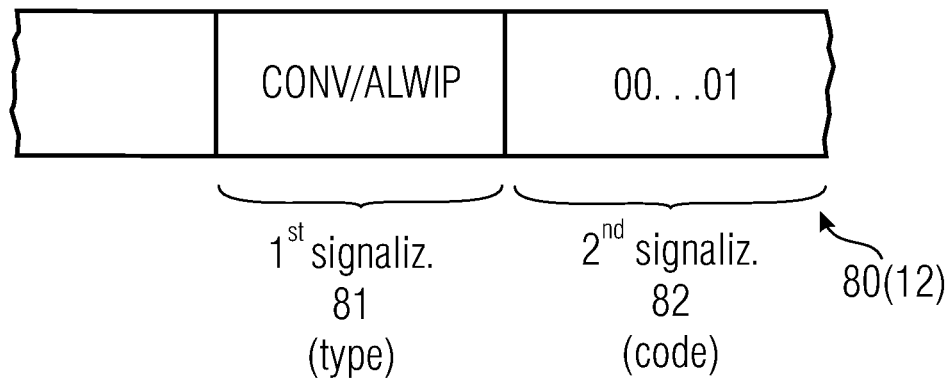
FIG. 8 partially shows a datastream.
Figure 9:
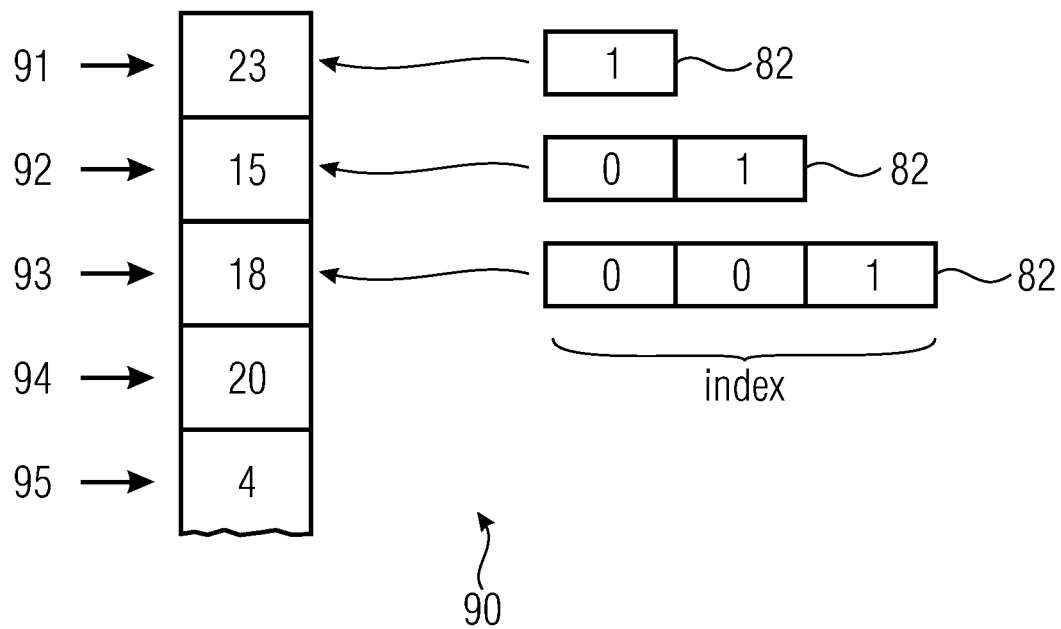
FIG. 9 shows indexes to be used in examples.

FIG. 8 shows a data (video) stream 80 (e.g., 12) encoding an image (e.g., 10 in FIGS. 1-4). The portion of the data stream 80 may refer to the predetermined block 18 to be decoded.

The data stream 80 may comprise a first signalization 81 for assigning the block 18 to the first set 121 or second set 122 of intra-prediction modes. The signalization 81 may need one single bit, in some examples.

A second signalization 82 (variable length code) in the data stream 80 may include a unary variable-length code of the type "000 . . . 1", as discussed above, or another variable-length code, which may assign cheaper codes (e.g., codes requiring a smaller number of bits) to more frequent intra prediction modes.

When the decoder 54 reads the first signalization 81, it understands that the block 18 is to be predicted with either an intra-prediction mode of the first set or an intra-prediction mode of the second set (i.e., though the flag 81, the block 18 is either assigned to the first set 121 of conventional modes or the second set 122 of ALWIP modes).

Then, in some examples the decoder 54 may sort the assigned set of prediction modes (as indicated in the first signalization 81) according to intra-prediction modes (e.g., previously used for neighboring blocks 17a-17c). A list 90 of intra-prediction modes may therefore be obtained ("list of most probable modes"). The list 90 may be stored in a register in the decoder 54 and the encoder 14. The list 90 may therefore provide a particular order which is here indicated with a first position 91, a second position 92, a third position 93, a fourth position 94, and a fifth position 95. Other positions may of course be provided, e.g., to cover all the modes of the assigned set. However, in some examples, the list 90 does not need to have as many positions as the number of modes in the set (either conventional modes or ALWIP modes), but could be smaller. In examples, it may be that the list 90 comprises less than 10 positions, e.g., a number of positions which is between 3 and 7, e.g., 5). In the list 90, the first position 91 is here taken by the prediction mode "23", while the second position 92 is taken by the prediction mode "15" etc. (The numbering of the modes may be stored in a look-up table, LUT, for example).

It is to be noted that, in examples, the assignment to the particular positions are not signaled in the data stream 80 (12), but may be determined by the decoder on the basis of the previously performed predictions on blocks 17a-17c. In some examples, the previously most-used intra prediction modes (or, in any case, intra prediction modes which are statistically more frequent) may gain the highest positions in the list 90 (highest positions may be understood as highest-ranking positions). In this case, the mode "23" is the previously most-used prediction mode and therefore is awarded of the first position 91. It is also to be noted that the same sorting is performed at the encoder. The encoder will obtain a copy of the list 90 (on the basis of the same historical data on the most-used prediction modes). Therefore, the encoder and the decoder share the same list even without the necessity of signaling it in the data stream 80. Other techniques are possible.

It has been understood that, by assigning the shortest (cheaper) codes (e.g., "1", "01", "001" . . . ) in the data stream 80 (e.g., 12) to the highest positions (91, 92, 93 . . . ) in the list 90, the size of the data stream 80 can be reduced. This conclusion has been possible on the basis of the consideration that the most-used prediction modes (e.g., "23", "15", "18" . . . ) are also the most probable prediction modes for the current block 18. (In alternative, it is the most statistically probable modes which are awarded the highest positions (highest ranks) in the list 90.) Therefore, by assigning short codes to the most probable prediction modes, a reduction of the size of the data stream 80 is obtained.

It is noted that the second signalization 82 is not necessarily encoded as unary code. For example, a truncated binary code may be used. An example of truncated binary code is provided in the following table:

| Index | Code in field 82 |
| --- | --- |
| 91 | 0 |
| 92 | 1 |
| 93 | 10 |
| 94 | 11 |
| 95 | 100 |
| 96 | 101 |
| 97 | 1100 |
| 98 | 1101 |
| 99 | 1110 |
| 100 | 1111 |

The index 0 is associated to the highest index 91 (which is in turn associated to the most probable mode), the index 1 is associated to the second-highest index (which is in turn associated to the second most probable mode), the index 10 is associated to the third-highest (which is in turn associated to the third most probable mode), and so on. As can be seen the third most probable mode is associated to an index which is less cheap than the indexes associate dot the first and second most probable modes (as index 10 for the third most probable mode needs two bits in the bitstream 80, while the indexes 0 and 1 for the first and second most probable modes only need one bit each for the encoding).

The second signalization 82 may therefore contain encoded an index which points to the particular position. E.g., if the second signalization 82 contains "1", the first position 91 will be pointed to, hence indicating that the mode "23" is to be used. If (with reduced probability) the second signalization 82 contains "01", the second position 92 will be pointed to, hence indicating that the mode "15" is to be used, and so on.

Accordingly, it is possible to predict for the encoder and the decoder the predetermined block 18 to be used using an intra prediction mode onto which the index points.

There may arise some issues in some cases. An example is when the predetermined block 18 is to be predicted using a conventional mode (i.e., the first signalization 81 indicates that a conventional mode is to be used), but one of the neighboring blocks 17a-17c has been previously predicted using an ALWIP mode. This would imply that one of the indices 91-95 of the list 90 should indicate an ALWIP mode, which cannot be used (as the first signalization 81 involves a conventional mode). Hence, a useless indication would be present in the list 90.

However, it has been understood that it is possible to map some ALWIP modes into conventional modes. Hence, if a particular ALWIP mode ALWIP1 had been used, the mapping will permit to derive a particular conventional mode CONV1 (mapping ALWIP1 according to the mapping). Hence, when an ALWIP mode is used for a previous block 17a, 17b, or 17c, subsequently one of the indexes 91-95 will indicate a mapped conventional mode associated to the previously used ALWIP mode. Accordingly, no index 91-95 of the list 90 will be wasted indicating a non-usable mode. The mapping may be pre-defined and known by both the encoder and the decoder.

The same may apply by mapping a conventional mode into an ALWIP mode. It is to be noted, however, that in some examples the list 90 of the most probable mode is only used for a particular set (e.g., the first set 121 of the conventional modes), while no such a list is used for other sets (or the list of most probable modes may be pre-defined, and fixed): this brings, in such examples, to the unnecessity of some mappings. (For example, in some cases the list of most probable ALWIP modes may be pre-defined based on pre-assumed probabilities, and is never changed on-the-fly: hence, no mapping is provided in these cases).

The mappings may also refer to block sizes: different mappings may be used for different sizes. Hence, there may be stored multiple mappings for different sizes (i.e., a mapping for a M×N size may be different from a mapping for $M_1 \times N_1$ size).

It is possible to define mappings from a first size to a second size. This may be, for example, when the neighboring, previously predicted block 17*a*, 17*b*, or 17*c* has a size which is different from the block 18 to be predicted.

It could also be possible to map ALWIP modes but associated to different sizes.

A discussion on the mappings is here provided.

If the assigned set is the second set 122 of intra-prediction modes (ALWIP), e.g. in sorting the assigned set, there may be used a first mapping which maps each intra-prediction mode of the first set of prediction modes onto a representative one in the second set of intra-prediction modes. If the assigned set is the second set of intra-prediction modes, in sorting the assigned set, there will be used a second mapping which maps each intra-prediction mode of the second set of prediction modes onto a representative one in the first set of intra-prediction modes.

Hereinafter, at least one of the following mappings may be used:

First mapping (101*a*, FIG. 10*a*'): conventional to ALWIP (same size);
Second mapping (102*a* in FIG. 10*a*', 102*b* in FIG. 10*b*): ALWIP to conventional (same size);
Third mapping (103, FIG. 10*c*): conventional to ALWIP (from a size of the neighboring block predicted through a conventional mode to a different size of the block 18 to be predicted through an ALWIP mode);
Fourth mapping (104, FIG. 10*d*): ALWIP to conventional (from a size of the neighboring block predicted through an ALWIP mode to a different size of the block 18 to be predicted through a conventional mode);
Fifth mapping (105, FIG. 10*a*'''): from ALWIP to ALWIP (different size);
Generalized fifth mapping (106, FIG. 10*e*): from one size to another size (general example)

Figure 10A:
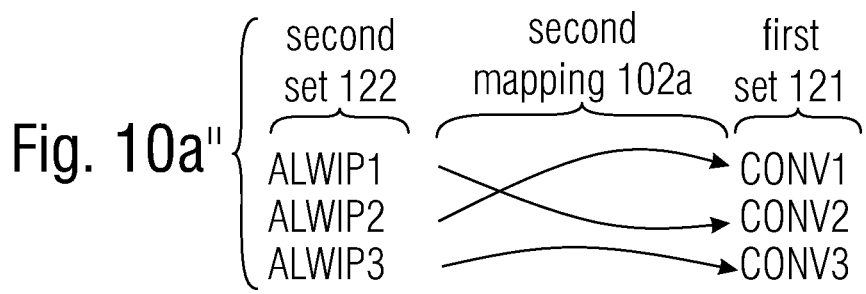
FIG. 10a (which is subdivided into FIGS. 10a', 10a", and 10a''')
Figure 10A:
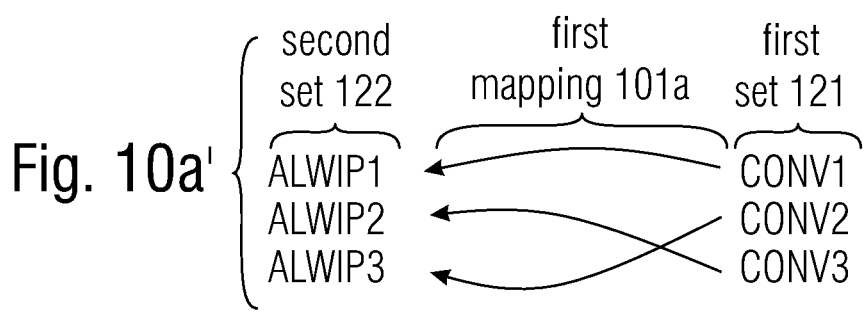
Figure 10A:
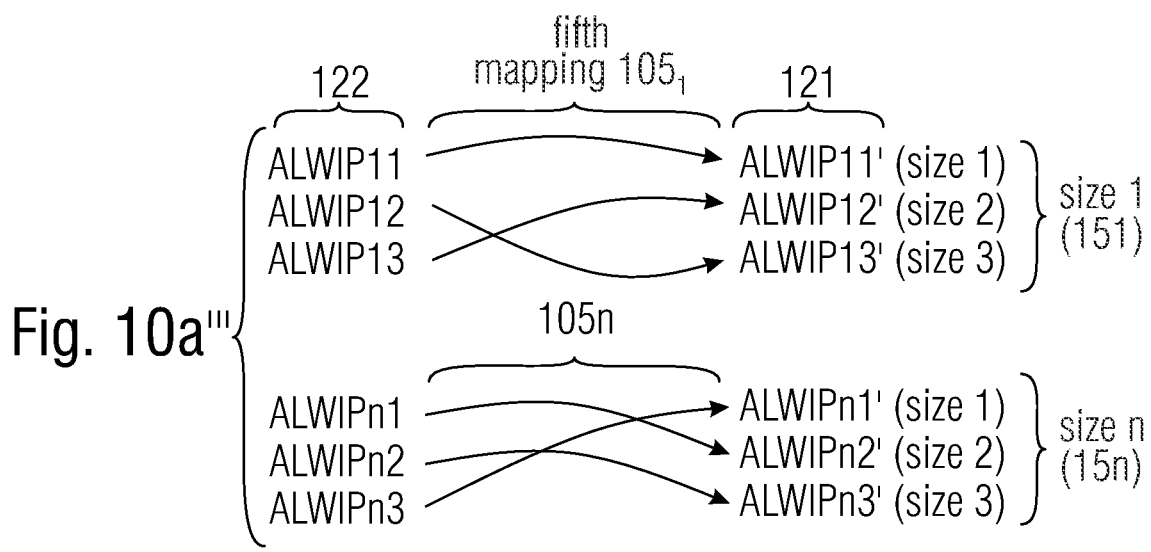

A mode detailed discussion is here provided. FIG. 10*a* is subdivided into FIGS. 10*a*', 10*a*'', 10*a*'''.

FIG. 10*a*' shows an example of a first mapping 101*a*, in which different conventional modes (CONV1, CONV2, CONV3) are mapped, through different mappings, into different ALWIP modes (ALWIP 1, ALWIP2, ALWIP3). In examples, the different conventional modes and the different ALWIP modes have the same size. In the examples in which, for ALWIP, the list 90 is not updated on the fly (but the indexes are provided based on pre-defined probabilities), this mapping is not used.

FIG. 10*a*'' shows an example of a second mapping 102*a*, in which different ALWIP modes (ALWIP 1, ALWIP2, ALWIP3) of the second set 122 are mapped into different conventional modes (CONV1, CONV2, CONV3) of the first set 121. In examples, the different conventional modes and the different ALWIP modes have the same size. This second mapping may be used when the list 90 of most probable modes is updated on-the-fly at least for conventional modes (hence, the list 90 can be called "list 90 of most probable conventional modes"). Hence, if a previous block 17*a*, 17*b*, or 17*c* has been predicted using ALWIP2, the list 90 will indicate the conventional mode CONV1 in one of its indexes (i.e., CONV1 will be one of the most probable conventional modes, even if CONV1 had not been already used, by virtue of ALWIP1 having been used, and by virtue of the second mapping 102*a* mapping ALWIP2 onto CONV1).

Figure 10B:
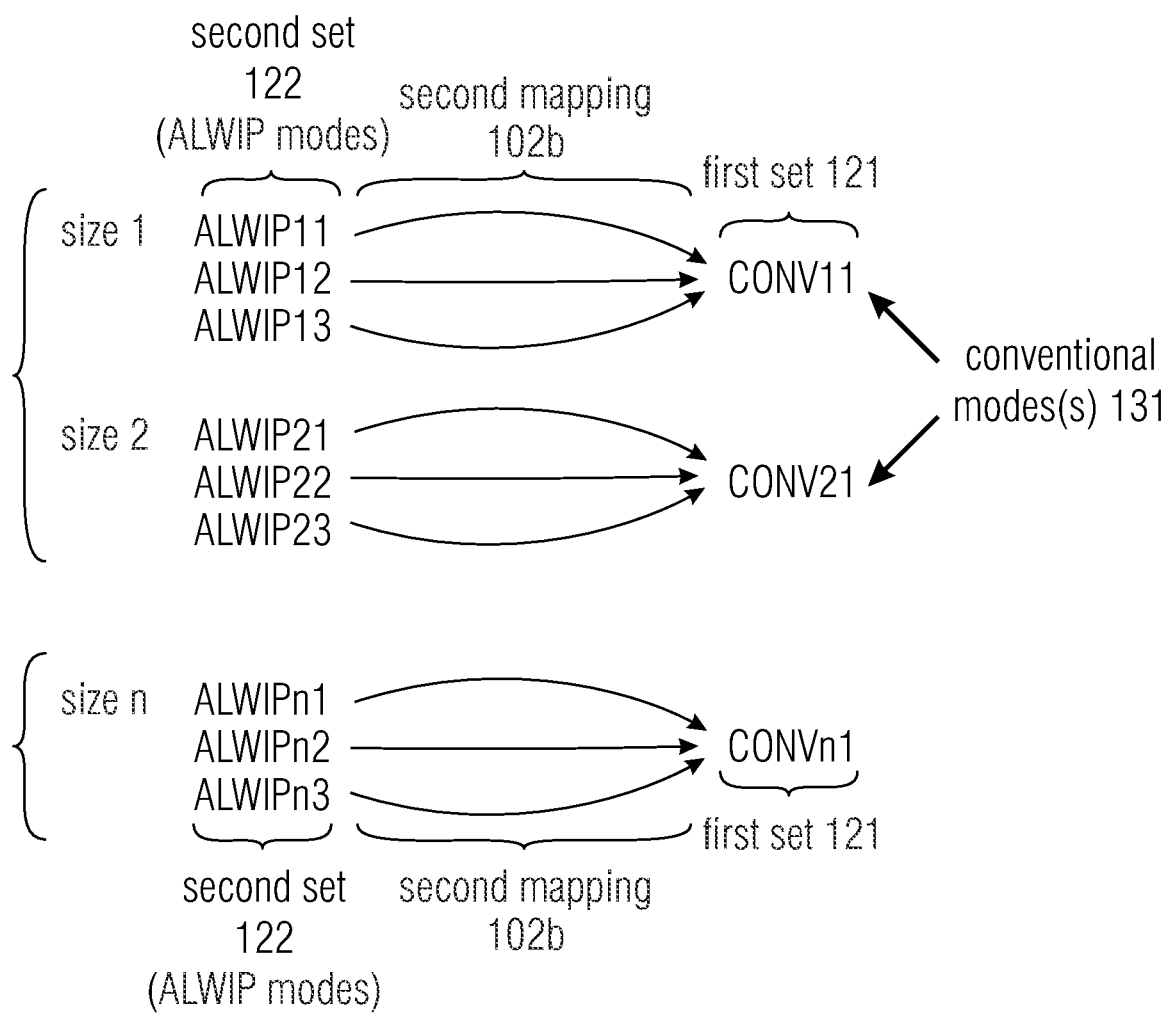
FIGS. 10b to 10e show techniques for mapping between different modes.
Figure 10C:
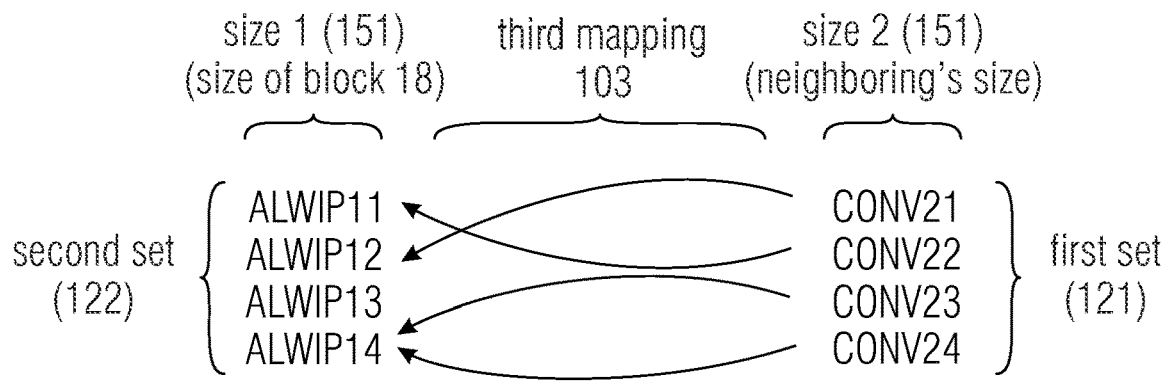

FIG. 10*c* shows an example of a third mapping 103, in which conventional modes of the first set 121 (size 152) are mapped into ALWIP modes of the second set 122 (size 151). In the examples in which, for ALWIP, the list 90 is not updated on the fly (but the indexes are provided based on pre-defined probabilities), this mapping is not used.

Figure 10D:
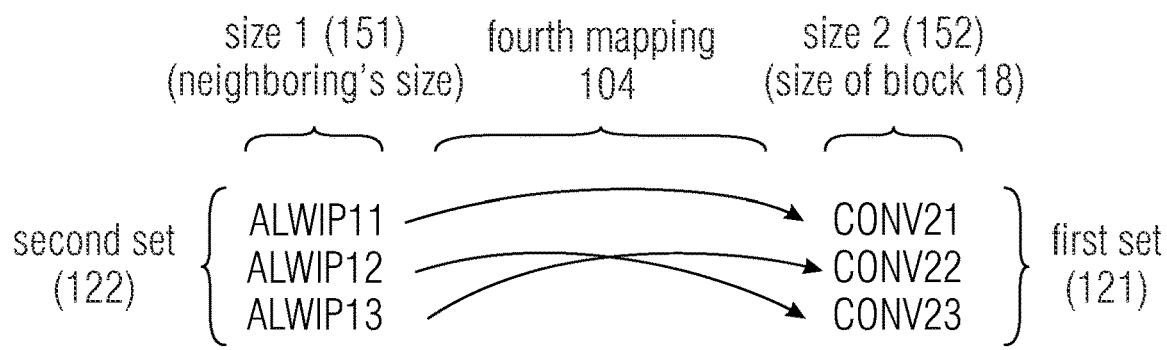

FIG. 10*d* shows an example of a fourth mapping 104, in which ALWIP modes of the second set 122 (size 151) are mapped into conventional modes of the first set 121 (size 152). In the examples in which, for ALWIP modes, the list 90 is not updated on the fly (but the indexes are provided based on pre-defined probabilities), this fourth mapping 104 is not used.

FIG. 10*a*''' shows an example of a fifth mapping 105, in which different ALWIP modes (ALWIP11, ALWIP12, ALWIP13) of the same size (size1 or 151) are mapped, through different mappings ($105_1$, $105_n$), into different ALWIP modes (ALWIP11', ALWIP12', ALWIP13') of different sizes. Other ALWIP modes (ALWIPn1, ALWIPn2, ALWIPn3) of the same size (size n or 15*n*) may be mapped into different ALWIP modes (ALWIPn1', ALWIPn2', ALWIPn3') of different sizes. Hence, there arises the possibility of mapping any ALWIP mode into a different other ALWIP mode.

Figure 10E:
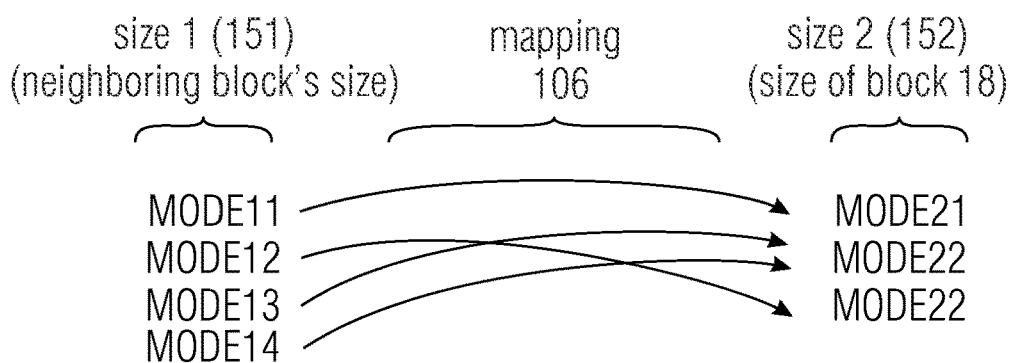

FIG. 10*e* shows mapping 106, which is a more general example than the fifth mapping 105. Here, different modes used for a size 151 are mapped onto modes for a different size 152. This mapping does not only maps ALWIP modes into ALWIP modes, but also conventional modes onto conventional modes, conventional modes onto ALWIP modes, and ALWIP modes onto conventional modes.

A particular case of the second mapping 102*a* is here discussed with reference to the second mapping 102*b* of FIG. 10*b*. In some examples, a plurality of (or all) ALWIP modes of the same size (among the set of sizes) may be mapped onto one single conventional mode. Here, a first set 121 of conventional modes 131 is shown. Here, for the first set 121 of conventional modes, only one mode 131 is represented, each of these modes being associated to a particular size (e.g., CONV11 being one particular conventional mode 131 for the size 1; CONV21 being one particular conventional mode 131 for the size 2; CONV1 being one particular conventional mode 131 for the size n; and so on). The first set 121 may include other conventional modes 131 which are here not shown. However, the conventional modes 131 (CONV11, CONV12, CONV13) which are here shown may be, for example, of the same type (e.g., all planar modes). A second set 122 of ALWIP modes is also shown. The second set 122 includes, for each size (e.g., size1, size2, . . . , size n), a plurality of modes (size1: ALWIP11, ALWIP12, ALWIP13; size2: ALWIP21, ALWIP22, ALWIP23 size n: ALWIPn1, ALWIPn2, ALWIPn3). A second mapping 102*b* may be defined. For example, a plurality of (or all) the ALWIP modes of the same size (size1) (i.e., ALWIP11, ALWIP12, ALWIP13) may be mapped to the same conventional mode CONV11 (which may have the same size of ALWIP11, ALWIP12, ALWIP13). Hence, even though there are other (non-shown) conventional modes 131 with same size (size1) in the first set 121, the plurality of (or all) the ALWIP modes is mapped to the same conventional mode conv11. The same may apply to the ALWIP modes of size 2 (ALWIP21, ALWIP22, ALWIP23), which are all mapped to the same conventional mode CONV21. The same may apply to the ALWIP modes of size n (ALWIPn1, ALWIPn2, ALWIPn3), which are all mapped to the same conventional mode convn1. In some examples, the conventional mappings CONV11, CONV21, CONV2, to which the plurality of ALWIP modes is mapped, may all be planar modes. Accordingly, multiple different ALWIP modes may be mapped onto one single conventional mode. (In specular examples, different ALWIP modes may be mapped into multiple conventional modes.)

In some examples, at least one of the following techniques may be implemented:
- if one of the neighboring blocks (17a-17c) is of the same block size within the set of block sizes as the predetermined block (18), but assigned to a different one of the first and second sets (121, 122) of intra-prediction modes, use the first or second mapping (101a, 101b, 102b);
- if one of the neighboring blocks (17a-17c) is of a different block size within the set of block sizes from the predetermined block (18), use,
  - if the assigned set for the predetermined block (18) is the second set (122) for the predetermined block's block size while an assigned set for the one neighboring block (17a-17c) is the first set (121) for the one neighboring block's block size, use the third mapping (103) which maps each intra-prediction mode of the first set (121) of prediction modes for the one neighboring block's block size, onto a representative one in the second set (122) of intra-prediction modes for the predetermined block's block size, and/or,
  - if the assigned set for the predetermined block (18) is the first set (121) for the predetermined block's block size while an assigned set for the one neighboring block (17a-17c) is the second set (122) for the one neighboring block's block size, use the fourth mapping (104) which maps each intra-prediction mode of the second set (122) of prediction modes for the one neighboring block's block size, onto a representative one in the first set (121) of intra-prediction modes for the predetermined block's block size, mapping and/or
- if one of the neighboring blocks (17a-17c) is of the different block size within the set of block sizes as the predetermined block (18), if the assigned set for the predetermined block (18) is the second set (122) for the predetermined block's block size and an assigned set for the one neighboring block (17a-17c) is the second set (122) for the one neighboring block's block size:
  - use the fifth mapping (105) which maps each intra-prediction mode of the second set (122) of prediction modes for the one neighboring block's block size, onto a representative one in the second set (122) of intra-prediction modes for the predetermined block's block size.

The mappings from conventional to ALWIP (e.g., 102a, 102b) may be used for chroma components when ALWIP modes have been used for luma components.

As explained above, in some examples the list 90 is static. This may be, for example, when the flag 81 involves the use of ALWIP modes, in these cases, in some examples, there is not a list 90 updated on-the-fly, but a list with pre-defined relationships.

In examples above, reference has been often made to a list 90 pointing at five modes through five indexes 91-95, but different (larger or smaller) numbers of indexes may be defined.

In examples, the first signalization 81 may involve one single bit (e.g., signaling a choice between "ALWIP mode" and "conventional mode"). In examples, the second signalization 82 may use a variable length: for example, cheaper codes (e.g., having narrower lengths) may be associated to statistically most frequent modes. In some cases, code length depends (e.g., monotonically) on the rank of the intra-prediction mode the index points to: higher ranks may be associated to most frequent indexes (and most frequent modes, too). An example may be a unary code (see above), even if other codes may be used.

Transpositions

Figures 11A, 11B:
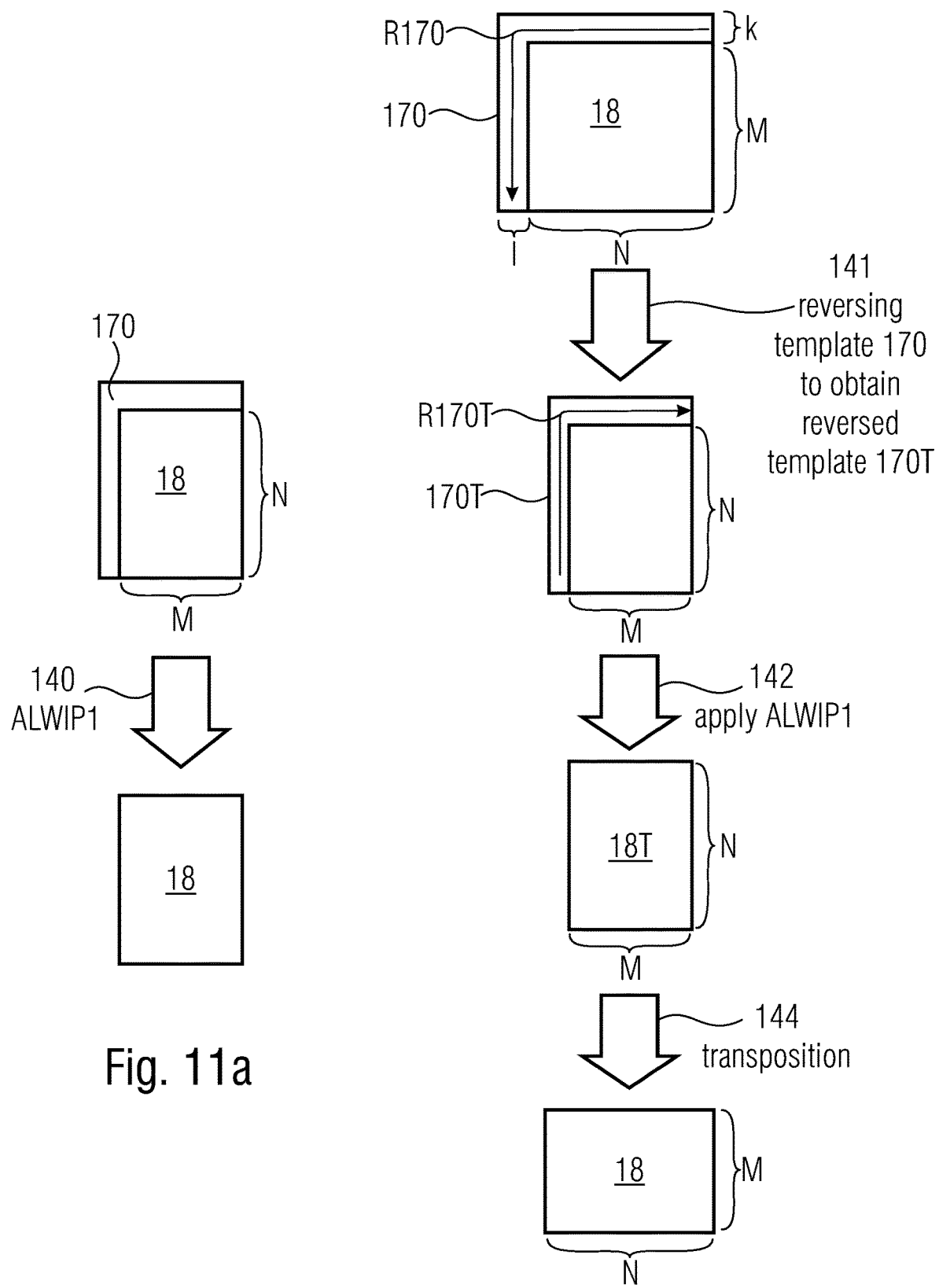
FIGS. 11a and 11b show examples of procedures.
Figure 11C:
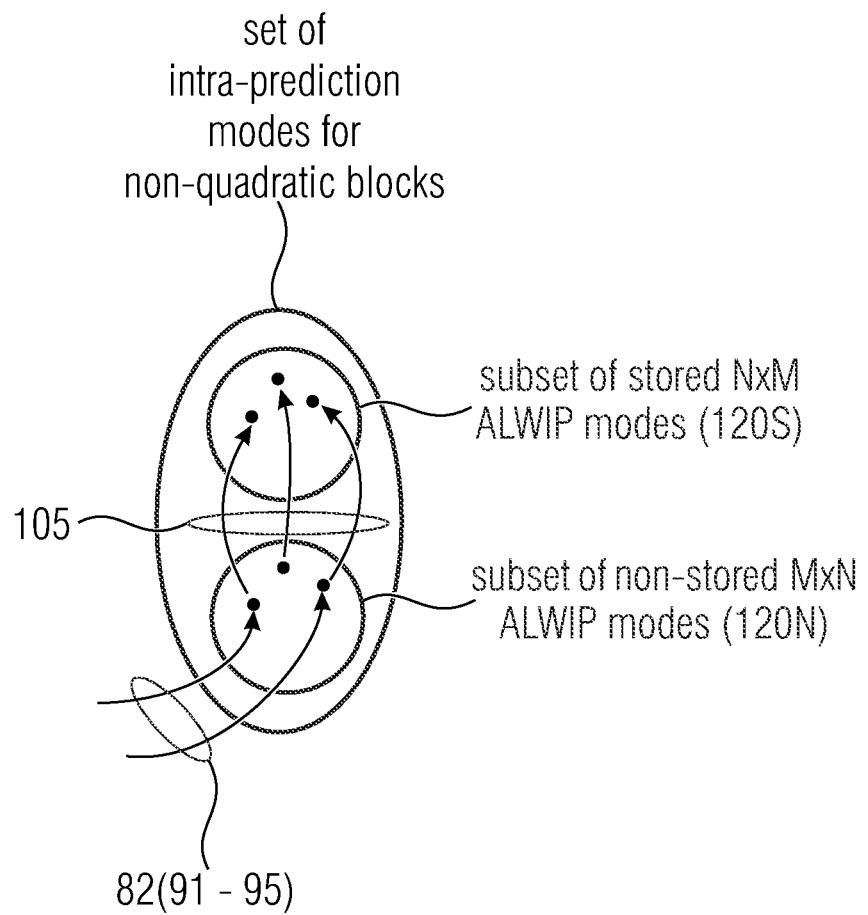
FIGS. 11c and 11d show examples of mapping.

Reference is now made to FIGS. 11a, 11b, and 11c, referring to the above discussed "transposing proposed prediction modes". Here, a predetermined block 18 of the size M×N (with M≠N) or N×M (with M≠N) is to be predicted from the previously-predicted neighboring blocks 17a, 17b, 17c, and in particular from the series of the P neighboring samples 17'a-17'c, which form a template 170. (It is here imagined that the block 17b shown in FIG. 5 is not used, but it could be used in some examples.)

We assume that the decoder 56 or the encoder 14 has a particular ALWIP mode (here indicated as ALWIP1) which is suitable for the size N×M, but not for the size M×N. Said in other terms, there is stored an N×M ALWIP matrix 17M is, but there is not a M×N ALWIP matrix 17M. (It could be imagined that it would be in principle be advantageous to have, stored, another M×N matrix for ALWIP mode. However, in order to reduce the storage and/or the signaling, it may be advantageous to reduce the amount of ALWIP modes stored in the encoder and/or decoder.)

In some cases, the first signalization 81 in the stream 80 (12) may indicate that an ALWIP mode is to be used for the predetermined block 18. The second signalization 82 may have, encoded, an index which is associated to ALWIP1 (or, in any case, to indicate ALWIP1). Hence, different operations may be performed according to the orientation of the block 18.

If, like in FIG. 11a, the predetermined block 18 to be predicted has the size M×N (which corresponds to the size of ALWIP1), then mode ALWIP1 is applied (140) to the P samples of the template 170, to predict the P samples of the block 18.

If, like in FIG. 11b, the predetermined block 18 to be predicted has the size M×N (which is the opposite of the size of the size of ALWIP1 as stored), then it is not possible to simply apply ALWIP1, as ALWIP1 has a size N×M different from the size M×N of the predetermined block 18 (it is hypothesized that there is not stored a N×M matrix 17M,). However, it has been understood that it is possible to adopt a technique according to which the encoder 14 or the decoder 54 performs the following steps:

1) reversing (141) the series of the template 170 (oriented according to the direction R170) to obtain a reversed template 170 (e.g., oriented according to the direction R170T);

2) applying (142) ALWIP1 to the reversed version 170T of the template 170, so as to obtain a predicted block 18T with size N×M (compliant with ALWIP1); and
3) transposing (144) the predicted block 18T, to obtain the predetermined block 18.

Notably, it is not necessary that a signaling is provided in the stream 12 (80) whether the M×N ALWIP mode or N×M ALWIP mode is to be used, and is not necessary to signal that a transposition is to be made. It is simply possible to use the fifth mapping 105 of FIG. 10a'''. In fact, in order to reconstruct block 18:

1) The second signalization 82 (either directly, or via the indexes 91-95 of the list 90) may signal that a particular ALWIP mode (e.g., ALWIP1) is to be used for an M×N block 18;
2) However, at the decoder there is not an M×N matrix stored for ALWIP1 (ALWIP1 may be considered as being part of a subset 120N of non-stored ALWIP modes);
3) Notwithstanding, at the decoder there stored an N×M ALWIP mode (which may be considered as being part of a subset 120S of stored ALWIP modes);
4) The mapping 105 maps the non-stored M×N ALWIP1 onto the stored N×M ALWIP mode;
5) The procedure of FIG. 11b may be performed, hence arriving at the reconstruction of the block 18.

Figure 11D:
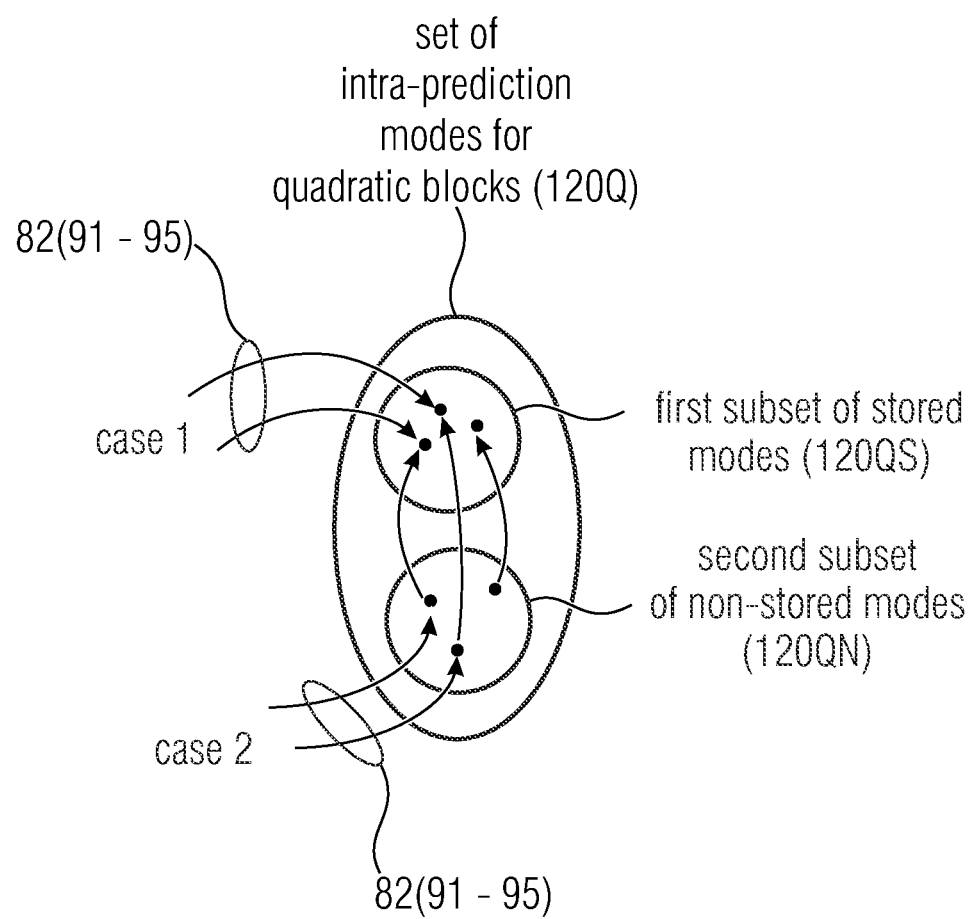

The example above is proposed for a rectangular block M×N with M≠N. However, an analogous procedure may be performed for a square (quadratic) block M×M. It has been noted in fact, that in some cases there arises the possibility of simply applying a reversed version of the template 170, performing the prediction using a stored transformation, and finally transposing the obtained block 180T, exactly as in FIG. 11b (but with M=N). As shown in FIG. 11d, a set 120Q of modes (ALWIP and/or conventional) may comprise the following subsets:

A first subset 120QS of stored modes for quadratic blocks (for these modes, the matrix 17M is stored); and
A second subset 120QN of non-stored modes for quadratic blocks, but for which it is possible to perform the prediction by using the method of FIG. 11b (with M=N).

Hence, if (CASE 1), an index 91-95 or a second signalization directly indicates a mode in the first subset 120QS of stored modes, then the mode is directly invoked (and the procedure of FIG. 11a is performed, with M=N).

Otherwise, if (CASE 2), an index 91-95 or a second signalization directly indicates a mode in the second subset 120QN of non-stored modes, then a mode from the first subset 120QS is invoked after having mapped from the mode of the subset 120QN.

Examples discussed above and below may be in the spatial domain and/or in the transform domain.

Example in the Transform Domain

Figure 12:
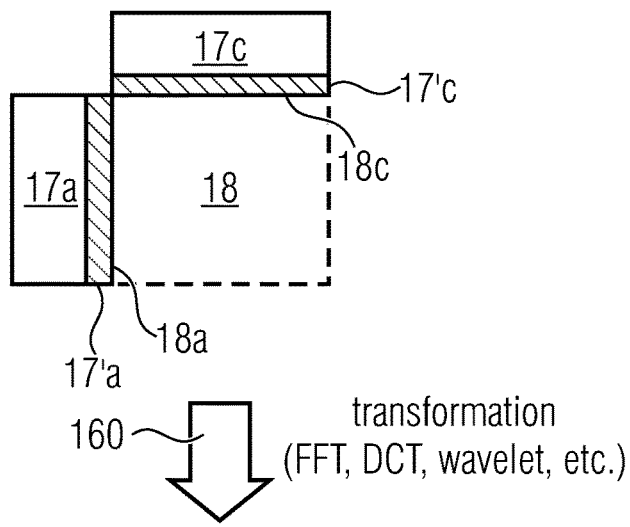
FIG. 12 (which is subdivided into FIGS. 12', 12", 12''', and 12"") and FIG. 13 show examples of procedures.
Figure 12:
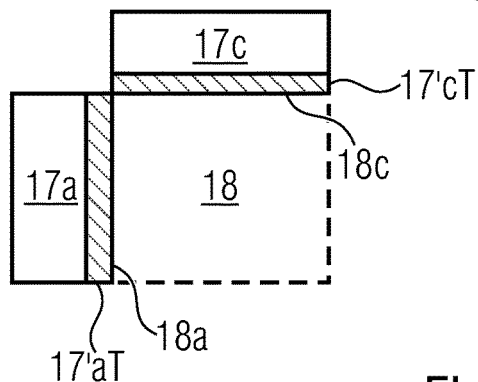
Figure 12:
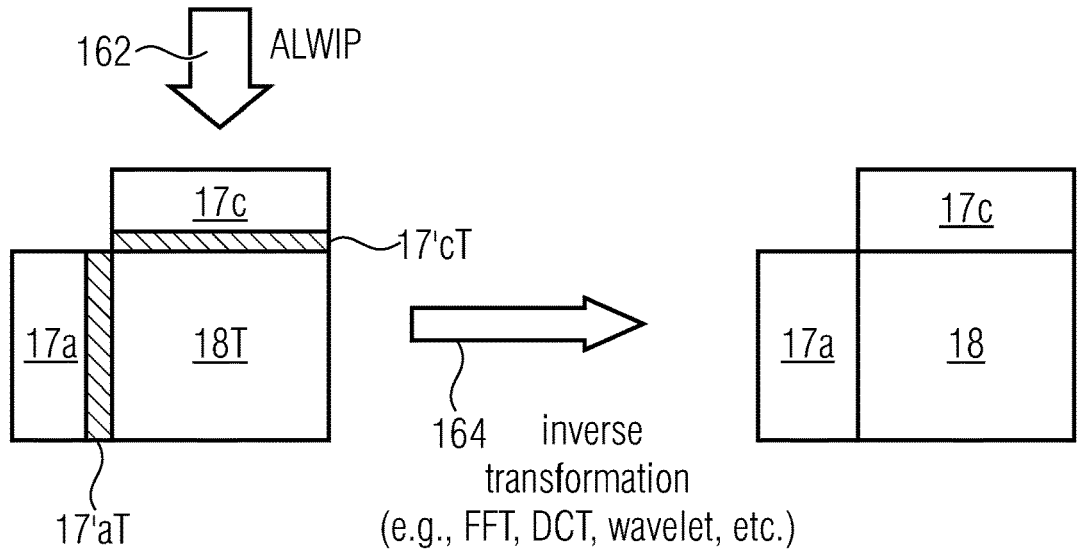

FIG. 12 shows the prediction of a spatial-domain block 18 (which may be one of the predetermined blocks 18 as above, e.g., as in FIG. 5) from previously predicted neighboring blocks 17c and 17a. The prediction is performed here in the transform domain (e.g., after having applied a transformation such as fast Fourier transform, FFT, and/or discrete cosine transform, DCT, wavelet, etc.).

FIG. 12' shows the predetermined block 18 to be predicted. Q values of the block 18 are to be predicted from first and second sets (e.g., proper subsets) 17'c and 17'a of the neighboring blocks 17c and 17a (the first and second sets 17'c and 17'a may represent lines or stripes or arrays in proximity, e.g. adjacent, to the sides 18c and 18a of the block 18 to be predicted, and may include already predicted samples). The values of the first and second sets 17'c and 17'a may be chosen independently of the sizes of the neighboring blocks 17c and 17a, respectively: whatever the dimensions of the neighboring blocks 17c and 17a, the dimensions of the first and second sets 17'c and 17'a are based on the dimensions of the block 18. The values of the first and second sets 17'c and 17'a (template) may be chosen independently of the sizes of the blocks 17c and 17a. In examples, the first and second sets 17'c, 17'a may be located along a one-dimensional path alongside the first and second sides 18c, 18a, respectively. As discussed above, it is possible to perform a subsampling, e.g., by only taking some particular transform coefficients.

A transform 160 (e.g., FFT, DCT, wavelet, etc.) may be applied to at least some of the samples of the first and second sets 17'c and 17'a. The first and second sets of transform coefficients 17'cT, 17'aT (template in the transform domain) may represent one-dimensional transforms of the samples of the first and second sets 17'c, 17'a, the latter being located along one-dimensional path. It is not necessary to have the whole transform of the neighboring blocks 17c and 17a, but only a low-frequency portion (or, in any case, a reduced portion). Advantageously, it does not matter if the sizes of the first and second sets 17'c and 17'a do not match the sizes of the sides 18c and 18a of the block 18: the length of the sets 17'c and 17'a may be longer or shorter than the length of the sides 18c and 18a.

FIG. 12" shows that the first and second sets 17'c and 17'a (formed by "transform coefficients") are now in the transform domain and are therefore indicated with 17'cT and 17'aT, respectively.

An ALWIP intra prediction transformation 162 is applied to the transform coefficients of the sets 17'cT and 17'aT. In FIG. 12''', therefore, a prediction block 18T of the block 18 in the transform domain is therefore obtained. The ALWIP intra prediction transformation 162 may be according to an intra prediction mode as signaled in signalization(s) 81 and/or 82. Notably, there arises the possibility that the prediction version 18T in the transform domain of the block 18 has too few transform coefficients: in that case, it is simply possible to perform a zero-padding operation before the inverse transformation 164: the remaining transform coefficients (e.g., the higher frequency bins) may be set at 0. Accordingly, after the inverse transformation 164, the entire set of values of the block 18 may be obtained. Hence, the transform-domain prediction block 18T may be smaller than the spatial-domain predicted block 18. The transform-domain prediction block 18T may also be greater than the predicted block 18. In that case, a low pass filter may be subsequently applied.

An inverse FFT, IFFT, or inverse DCT, IDCT, or another inverse transformation 164 is applied to the prediction block 18T, to obtain the predicted block 18 in the spatial domain in FIG. 12"".

In some examples, it is possible to yield a predictor of the predetermined block 18 in spatial domain.

Conventional Intra Prediction Modes

The following is a discussion on convectional intra prediction modes, at least some of which can be included in the first set 121 of conventional intra prediction modes (e.g., conv1, conv2, etc.).

The conventional intra prediction modes can be represented by matrix-vector multiplication and filtering operations applied to the input vector resp. the output vector. However, we point out that the matrices used in the latter computations of matrix vector products have a very special structure as we sail explain now.

To set up notation, we assume that an M×N block (M rows, N columns) is given on which an intra-prediction signal (in the luma component) is to be computed by a conventional intra prediction mode. The reference samples, which serve as an input of the prediction are comprised of already reconstructed samples. Typically, the reference samples may consist of a line of N+q samples above the block (where some samples above right of the block may not be available directly but might be generated by a fixed padding operation) and of M+p samples left of the block (where some samples below left of the block may not be available directly but might be generated by a fixed padding operation).

For the conventional intra prediction modes, the reference samples are regarded as a vector ref of size M+p+N+q. The first M+p entries of that vector consist of the reference samples left of the block and the last N+p entries of that vector consist of the samples above the block.

We first describe the case that the conventional intra prediction mode is a directional intra prediction mode, also called angular intra prediction mode.

Here, in a first step, an interpolation filtering operation is applied to the reference samples ref. The latter operation generates sample values on non-integral sample positions lying between the true sample positions in a fixed resolution. Thus, for a fixed integer k and each $i \in \{1, \ldots, M+p+N+q-1\}$, k sample values are generated whose sample position lies between the i-th and the (i+1)-th entry of ref. The interpolation filtering operation may optionally be preceded or succeeded by a smoothing filtering operation. The overall result of the filter operations can again be regarded as a vector of size (M+p+N+q)*(k+1)−k which shall be denoted as $\text{ref}_{fltr}$. It is pointed out that for some directional modes, for example the horizontal or the vertical intra prediction mode, no interpolation needs to be carried out, i.e. the number k may be equal to zero.

In a second step, for a fixed matrix A which corresponds to the conventional intra prediction mode and which has M*N rows and (M+p+N+q)*(k+1)−k columns, the prediction signal pred is computed as the matrix vector product $$\text{pred} = A \cdot \text{ref}_{fltr},$$

where · the denotes matrix-vector multiplication. Here, each row of the matrix A has only one non-zero entry which consist of a 1. In other words, each predicted sample value is exactly one value of $\text{ref}_{fltr}$.

In a final step, a second filtering operation might be applied to a signal which is the extension of pred by the already reconstructed samples left of the block resp. above the block to yield the overall directional intra-prediction signal.

Next, we describe the case that the conventional intra prediction mode is the planar mode. Here, only a smoothing and no interpolation operation might be applied to the reference samples to yield the vector $\text{ref}_{fltr}$. If the (unfiltered) planar prediction signal $\text{pred}_{planar}$ is computed by a matrix vector product $$\text{pred}_{planar} = A_{planar} \cdot \text{ref}_{fltr},$$

then the matrix $A_{planar}$ has the property that each row of $A_{planar}$ only consists of 4 non-zero entries. In other words, each predicted sample value is computed as a linear combination of 4 reference sample values. The column position of the 4 non-zero entries of a fixed row of $A_{planar}$ are the position in $\text{ref}_{fltr}$ corresponding to the reference sample left of the block that lies in the same row as the sample to be predicted, to the reference sample above of the block that lies in the same column as the sample to be predicted as well as the reference sample that lies in the row above the block and is the first sample in that row that lies strictly right of the block as well as the reference sample that lies in the column left of the block and is the first sample in that column that lies strictly below the block.

In a final step, a second filtering operation might be applied to a signal which is the extension of $\text{pred}_{planar}$ by the already reconstructed samples left of the block resp. above the block to yield the overall planar intra-prediction signal.

We finally describe the case that the conventional intra prediction mode is the DC mode. Here, if the (unfiltered) DC-prediction signal $\text{pred}_{DC}$ is computed by a matrix vector product $$\text{pred}_{DC} = A_{DC} \cdot \text{ref}_{fltr},$$

then the matrix $A_{DC}$ has the property that all rows of $A_{DC}$ are equal. In a final step, a second filtering operation might be applied to a signal which is the extension of $\text{pred}_{DC}$ by the already reconstructed samples left of the block resp. above the block to yield the overall DC intra-prediction signal.

It is pointed out that the matrices used in the ALWIP intra prediction of the present application are not a priori constrained to one of the aforementioned patterns of the matrices corresponding to the directional-resp. the DC-resp. the planar-mode. Rather, they are the result of an offline data-driven training approach that takes into account for example the possibilty of splitting blocks into various shapes, a loss function modeling the loss (rate or rate-distortion) of a typical video encoder, the signalization costs needed to signal a mode as well as various other features known in the art.

Downsampling/Upsampling, Transform Domain for ALWIP

Reference is now made to FIG. 13. As explained above, in some cases, an encoder or decoder may perform transformations between predictors of different block sizes, e.g. by downsampling and/or upsampling.

As explained above, the "second template 1160" (in the spatial domain) may refer to a group of Q neighboring samples (above identified as 17'a, 17'b, 17'c) used for performing the intra prediction, but for which an ALWIP mode is not at disposal of the encoder or decoder. Basically, the "second template 1160" is formed by samples of 17'a, 17'b, 17'c which are used for the ALWIP prediction.

The discussion below is valid for both the ALWIP transformations and the conventional transformations, but is here mainly intended for ALWIP transformations.

FIG. 13 shows a current predetermined spatial-domain block $B_1$ (size $M_1 \times N_1$), which may be one block 18 in the examples above. The block 18 is to be predicted through an ALWIP transformation (e.g., one of the above). However, at the encoder or decoder there is at disposal an ALWIP transformation for a different size M×N (with $M \neq M_1$ and/or $N \neq N_1$).

It is noted that the second template 1160 (formed by samples 17'a, 17'b, 17'c) is already reconstructed (predicted).

If there is stored no ALWIP mode for reconstructing block 18 ($B_1$) by virtue of the dimensions of block 18 ($B_1$), in case an ALWIP transformation is at disposal for a block (B) with different dimensions M×N, the following procedure may be implemented. Notably, the ALWIP transformation for the block B of size M×N would need a template (here referred to as "first template 1161") with different size than the already obtained second template 1160. Hereinafter a technique which overcomes this impairment is discussed.

A transformation operation (here indicated as D) may, for example, be applied to the second template 1160. The transformation D may provide an element 1136, which is formed of a transformed (resampled) first template 1161 and a block 1138 (B) of size M×N to be predicted.

For example, the $M_1 \times N_1$ block $B_1$ (18) (with unknown coefficients) may be theoretically transformed into an M×N block B (138) (which, at this point, has also unknown coefficients). As the coefficients of block B (138) are unknown: a transformation into the transform domain is not necessary.

Analogously, the transformation D transforms the template 1160 (size M×N) into a different template 1161 (size $M_1 \times N_1$) with different dimensions.

In some cases, the transformation operation D may be, where $M_1 > M$ and $N_1 > N$ (and in particular where M is a multiple of $M_1$ and N is a multiple of $N_1$), a downsampling operation. For example, in case of $M_1 = 2*M$ and $N_1 = 2*N$, the transformation operation D may simply be based on hiding some bins in a chess-like fashion.

At this point, the block B is predicted in M×N through an ALWIP transformation discussed above. The ALWIP transformation (associated to the size M×N) is contained at the encoder or decoder. At passage 1138a, apparatus 14 or 54 may now use (e.g., at the predictor 44, 44') the ALWIP transformation natively defined for an M×N block. By applying the passage discussed above, the prediction is obtained for block B of size M×N.

The prediction in block B (1138) is obtained for size M×N, while the image to be reconstructed shall have size $M_1 \times N_1$. It is simply possible to perform a transformation 1140 (U) which transports the block B (1138) from size M×N into a block 18 of size $M_1 \times N_1$. This transformation 1140 (U) may be, for example, a bilinear interpolation or an upsampling operation. This transformation 1140 (U) may be may be performed by introducing coefficients in the $M_1 \times N_1$ block, besides the coefficients in the M×N block 138. For example, in case of $M_1 = 2*M$ and $N_1 = 2*N$, it is simply possible to perform an interpolation (e.g., bilinear interpolation), so as to approximate ("guess") the coefficients of that had been discarded by the transformation D. An $M_1 \times N_1$ prediction is therefore obtained as element block 18, and may be used for displaying the block image as part of the image 10.

In examples, it is possible to perform mappings from a mode which would be used for the block 18 ($B_1$) to the mode 1138a.

Further Embodiments and Examples

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine-readable carrier.

In other words, an example of method is, therefore, a computer program having a program-instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example of the method is, therefore, a data stream or a sequence of signals representing the computer program for performing one of the methods described herein. The data stream or the sequence of signals may for example be transferred via a data communication connection, for example via the Internet.

A further example comprises a processing means, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

Equal or equivalent elements or elements with equal or equivalent functionality are denoted in the following description by equal or equivalent reference numerals even if occurring in different figures.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus comprising a decoder for decoding a picture from a data stream supporting a first set of intra-prediction modes including a plurality of directional prediction modes and at least one of a DC mode and a planar mode, and a second set of intra-prediction modes, wherein the decoder is configured to:

decode a predetermined block of the picture by:

assigning, based on a first signal in the data stream, the predetermined block to the first set of intra-prediction modes or the second set of intra-prediction modes, sorting the assigned set of intra-prediction modes according to intra-prediction modes used for neighboring blocks, neighboring the predetermined block, to acquire a list of intra-prediction modes, deriving, for the predetermined block, from the data stream, an index to an intra-prediction mode in the list of intra-prediction modes, predicting the predetermined block using the intra-prediction mode to which the index points,
wherein decoder is configured to,
if the predetermined block is assigned to the first set of intra-prediction modes, sorting the assigned set using a second mapping that maps each intra-prediction mode of the second set of prediction modes onto a representative intra-prediction mode in the first set of intra-prediction modes, wherein the second mapping maps a plurality of modes of the second set of intra-prediction modes to a single intra-prediction mode of the first set of intra-prediction modes.

2. The apparatus of claim 1, wherein the decoder is further configured to decode, from the data stream, the index using a variable length code so that a code length monotonically depends on a rank of the intra-prediction mode in the list of intra-prediction modes to which the index points.

3. The apparatus of claim 1, wherein the variable length code is a unary code.

4. The apparatus of claim 1, wherein the code is a truncated binary code.

5. The apparatus of claim 1, wherein the decoder is configured to sort the assigned set of intra-prediction modes so that the intra-prediction modes within the assigned set of intra-prediction modes used for the neighboring blocks, or being targeted by the intra-prediction modes used for the neighboring blocks via the second mapping, are put at a beginning of the list.

6. The apparatus of claim 1, wherein:
the decoder is configured to subdivide the picture into a plurality of blocks of different block sizes, including the predetermined block,
the decoder is configured to support, for each of a set of block sizes, a first set of intra-prediction modes including a plurality of directional prediction modes and at least one of a DC mode and a planar mode, and a second set of intra-prediction modes,
wherein the decoder is configured to,
if one of the neighboring blocks is of the same block size within the set of block sizes as the predetermined block, but assigned to a different one of the first and second sets of intra-prediction modes, sorting the assigned set using the first and second mapping, and
if one of the neighboring blocks is of a different block size within the set of block sizes from the predetermined block, sorting the assigned set,
if the assigned set for the predetermined block is the first set of intra-prediction modes for the predetermined block's block size while an assigned set for the one neighboring block is the second set for the one neighboring block's block size, using a third mapping that maps each intra-prediction mode of the second set of prediction modes for the one neighboring block's block size to a representative intra-prediction mode in the first set of intra-prediction modes for the predetermined block's block size.

7. The apparatus of claim 1, wherein
the decoder is configured to subdivide the picture into a plurality of blocks of different block sizes, including the predetermined block,
the decoder is configured to support, for each of a set of block sizes, a first set of intra-prediction modes including a plurality of directional prediction modes and at least one of a DC mode and a planar mode, and a second set of intra-prediction modes,
wherein decoder is configured to,
if the predetermined block is non-quadratic, perform the predicting of the predetermined block using the intra-prediction mode to which the index points, by
applying, to a series of neighboring samples neighboring the predetermined block, a linear or affine linear transformation associated with the intra-prediction mode to which the index points if the predetermined block is oriented in a first way, and
applying a reversed version of the series of neighboring samples neighboring the predetermined block onto said linear or affine linear transformation associated with the intra-prediction mode to which the index points to acquire a predicted block and subsequently transposing the predicted block if the predetermined block is oriented in a second way, perpendicular to the first way.

8. The apparatus of claim 1, wherein the second set of intra-prediction modes includes a first subset of intra-prediction modes and a second subset of intra-prediction modes, and the predetermined block is quadratic,
wherein decoder is configured to,
perform the predicting of the predetermined block using the intra-prediction mode to which the index, by
applying, to a series of neighboring samples neighboring the predetermined block, a linear or affine linear transformation associated with the intra-prediction mode to which the index points if the intra-prediction mode to which the index points is included in the first subset, and
applying, to a reversed version of the series of neighboring samples neighboring the predetermined block, a linear or affine linear transformation associated with an intra-prediction mode of the first subset of intra-prediction modes to acquire a predicted block and subsequently transposing the predicted block if the intra-prediction mode to which the index points is included in the second subset.

9. The apparatus of claim 1, wherein, for at least one of the intra-prediction modes of the second set, the prediction using the intra-prediction mode to which the index points involves predicting the predetermined block from one of spatial domain to transform domain or transform domain to transform domain.

10. The apparatus of claim 1, wherein the decoder is configured to use an intra-prediction mode of the first set of intra-prediction modes or the second set of intra-prediction modes for the luma component and an intra-prediction mode of the first set of intra-prediction modes for the chroma component.

11. The apparatus of claim 1, wherein the decoder is configured to map at least one mode of the second set of intra-prediction modes used for a luma component to a mode of the first set of intra-prediction modes for the chroma component.

12. The apparatus of claim 1, wherein the second mapping maps all the modes of the second set of intra-prediction modes into a single mode of the first set of intra-prediction modes.

13. The apparatus of claim 1, wherein the second mapping maps all the modes of the second set of intra-prediction modes to a single mode of the first set of intra-prediction modes, wherein the single mode of the first set of intra-prediction modes is the planar mode.

14. A method for decoding a picture from a data stream supporting a first set of intra-prediction modes including a plurality of directional prediction modes and at least one of a DC mode and a planar mode, and a second set of intra-prediction modes, the method comprising:
    decoding a predetermined block of the picture by:
        assigning, based on a first signal in the data stream, the predetermined block to the first set of intra-prediction modes or the second set of intra-prediction modes,
        sorting the assigned set of prediction modes according to intra-prediction modes used for neighboring blocks, neighboring the predetermined block, to acquire a list of intra-prediction modes,
        deriving, for the predetermined block, from the data stream, an index to an intra-prediction mode in the list of intra-prediction modes,
        predicting the predetermined block using an intra-prediction mode to which the index points,
    wherein decoding is based on,
        if the assigned set is the first set of intra-prediction modes, sorting the assigned set using a second mapping that maps each intra-prediction mode of the second set of prediction modes to a representative intra-prediction mode in the first set of intra-prediction modes, wherein the second mapping maps a plurality of modes of the second set of intra-prediction modes to a single intra-prediction mode of the first set of intra-prediction modes.

15. A non-transitory digital storage medium having a computer program stored thereon to perform a method for decoding a picture from a data stream supporting a first set of intra-prediction modes including a plurality of directional prediction modes and at least one of a DC mode and a planar mode, and a second set of intra-prediction modes, said method, when the computer program is executed by a computer, comprising:
    decoding a predetermined block of the picture by:
        assigning, based on a first signal in the data stream, the predetermined block to the first set of intra-prediction modes or the second set of intra-prediction modes,
        sorting the assigned set of prediction modes according to intra-prediction modes used for neighboring blocks, neighboring the predetermined block, to acquire a list of intra-prediction modes,
        deriving, for the predetermined block, from the data stream, an index to an intra-prediction mode in the list of intra-prediction modes,
        predicting the predetermined block using an intra-prediction mode to which the index points,
    wherein decoding is based on, and
        if the assigned set is the first set of intra-prediction modes, sorting the assigned set using a second mapping that maps each intra-prediction mode of the second set of prediction modes onto a representative intra-prediction mode in the first set of intra-prediction modes, wherein the second mapping maps a plurality of modes of the second set of intra-prediction modes to a single intra-prediction mode of the first set of intra-prediction modes.

16. An apparatus comprising an encoder for encoding a picture on a data stream supporting a first set of intra-prediction modes including a plurality of directional prediction modes and at least one of a DC mode and a planar mode, and a second set of intra-prediction modes, wherein the decoder is configured to:
    encode a predetermined block of the picture by
        assigning, and encoding in a first signal in the data stream, the predetermined block to the first set of intra-prediction modes or the second set of intra-prediction modes,
        sorting the assigned set of prediction modes according to intra-prediction modes used for neighboring blocks, neighboring the predetermined block to acquire a list of intra-prediction modes,
        determining, for the predetermined block an index to an intra-prediction mode in the list of intra-prediction modes,
        predicting the predetermined block using an intra-prediction mode the intra-prediction mode to which the index points,
    wherein the encoder is configured to,
        if the predetermined block is assigned to the first set of intra-prediction modes, sorting the assigned set using a second mapping that maps each intra-prediction mode of the second set of prediction modes onto a representative intra-prediction mode in the first set of intra-prediction modes, wherein the second mapping maps a plurality of modes of the second set of intra-prediction modes to a single intra-prediction mode of the first set of intra-prediction modes.

17. The apparatus of claim 16, wherein the decoder is further configured to encode in the data stream the index using a variable length code so that a code length monotonically depends on a rank of the intra-prediction mode in the list of intra-prediction modes to which the index points.

18. The apparatus of claim 17, wherein the variable length code is a unary code or a truncated binary code.

19. The apparatus of claim 16, configured to sort the prediction modes according to their probability and/or historical data regarding the previous uses for other blocks.

20. The apparatus of claim 16, wherein the decoder is configured to write a second signal in the data stream with a first symbol continuously repeated up to a second symbol, from which the index in the list can be derived on the basis of the length of the symbol repetitions.

21. The apparatus of claim 16, wherein the decoder is configured to sort the assigned set of intra-prediction modes so that the intra-prediction modes within the assigned set of intra-prediction modes used for the neighboring blocks, or being targeted by the intra-prediction modes used for the neighboring blocks via the second mapping, are put at a beginning of the list.

22. The apparatus of claim 16, wherein the decoder is configured to sort the set of intra-prediction modes for the block size of the predetermined block so that the intra-prediction modes within the this set of intra-prediction modes used for the neighboring blocks or being targeted by the intra-prediction modes used for the neighboring blocks via the mapping, are put at a beginning of the list.

23. The apparatus of claim 16, wherein
    the encoder is configured to subdivide the picture into a plurality of blocks of different block sizes, including the predetermined block,
    the encoder is configured to support, for each of a set of block sizes, a first set of intra-prediction modes including a plurality of directional prediction modes and at least one of a DC mode and a planar mode, and a second set of intra-prediction modes,
    wherein the encoder is configured to,
        if one of the neighboring blocks is of the same block size within the set of block sizes as the predetermined block, but assigned to a different one of the first and second sets of intra-prediction modes, sorting the assigned set using the first and second mapping, and
if one of the neighboring blocks is of a different block size within the set of block sizes from the predetermined block, (e.g. they are not the same) in sorting the assigned set, sorting the assigned set,
if the assigned set for the predetermined block is the first set for the predetermined block's block size while an assigned set for the one neighboring block is the second set for the one neighboring block's block size, using a third mapping that maps each intra-prediction mode of the second set of prediction modes for the one neighboring block's block size to a representative intra-prediction mode in the first set of intra-prediction modes for the predetermined block's block size.

24. The apparatus of claim 16, wherein
the encoder is configured to subdivide the picture into a plurality of blocks of different block sizes, including the predetermined block,
the encoder is configured to support, for each of a set of block sizes, a first set of intra-prediction modes including a plurality of directional prediction modes and at least one of a DC mode and a planar mode, and a second set of intra-prediction modes,
wherein encoder is configured to,
if the predetermined block is non-quadratic, perform the predicting of the predetermined block using the intra-prediction mode to which the index points, by
applying, to a series of neighboring samples neighboring the predetermined block, a linear or affine linear transformation associated with the intra-prediction mode to which the index points if the predetermined block is oriented in a first way, and
applying, to a reversed version of the series of neighboring samples neighboring the predetermined block, said linear or affine linear transformation associated with the intra-prediction mode to which the index points to acquire a predicted block and subsequently transposing the predicted block if the predetermined block is oriented in a second way, perpendicular to the first way.

25. The apparatus of claim 16, wherein
the second set of intra-prediction modes includes a first subset of intra-prediction modes and a second subset of intra-prediction modes, and the predetermined block is quadratic,
the encoder is configured to:
perform the predicting of the predetermined block using the intra-prediction mode to which the index points, by
applying, to a series of neighboring samples neighboring the predetermined block, a linear or affine linear transformation associated with the intra-prediction mode to which the index points if the intra-prediction mode to which the index points is included in the first subset, and
applying, to a reversed version of the series of neighboring samples neighboring the predetermined block, a linear or affine linear transformation associated with an intra-prediction mode of the second subset of intra-prediction modes to acquire a predicted block and subsequently transposing the predicted block if the intra-prediction mode to which the index points is included in the second subset.

26. The apparatus of claim 16, wherein, for at least one of the intra-prediction modes of the second set, the prediction using the intra-prediction mode to which the index points involves predicting the predetermined block from one of spatial domain to transform domain or transform domain to transform domain.

27. The apparatus of claim 16, wherein the decoder is configured to use an intra-prediction mode of the first set of intra-prediction modes or the second set of intra-prediction modes for the luma component and a intra-prediction mode of the first set of intra-prediction modes for the chroma component.

28. The apparatus of claim 16, wherein the decoder is configured to map at least one mode of the second set of intra-prediction modes used for a luma component into a mode of the first set of intra-prediction modes for the chroma component.

29. The apparatus of claim 16, wherein the second mapping maps all the modes of the second set of intra-prediction modes into a single mode of the first set.

30. The apparatus of claim 16, wherein the single mode of the first set of intra-prediction modes is the planar mode.

31. The apparatus of claim 16, wherein the decoder is configured so that according to each of the set of intra-prediction modes, the predetermined block is predicted by mapping a set of P neighboring samples neighboring the predetermined block using a linear or affine linear transformation to a set of Q predicted values for samples of the predetermined block,
wherein, for each of the second set of intra-prediction modes, the linear or affine linear transformation comprises P*Q weighting factors among which at least ¼ P*Q weighting factors are non-zero weighting values, which include, for each of the Q predicted values, a series of P weighting factors relating to the respective predicted value, wherein the series, when arranged one below the other according to a raster scan order among the samples of the predetermined block, form an envelope that is omnidirectionally non-linear.

32. A method for encoding a picture on a data stream supporting a first set of intra-prediction modes including a plurality of directional prediction modes and at least one of a DC mode and a planar mode, and a second set of intra-prediction modes, comprising:
assigning, and encoding in a first signal in the data stream, the predetermined block to the first set of intra-prediction modes or the second set of intra-prediction modes,
sorting the assigned set of prediction modes according to intra-prediction modes used for neighboring blocks, neighboring the predetermined block, to acquire a list of intra-prediction modes,
determining, for the predetermined block, an index to an intra-prediction mode in the list of intra-prediction modes,
predicting the predetermined block using an intra-prediction mode to which the index points,
encoding the data stream,
wherein the encoder is configured to,
if the assigned set of intra-prediction modes is the first set of intra-prediction modes, in sorting the assigned set of intra-prediction modes, use a second mapping which maps each intra-prediction mode of the second set of prediction modes to a representative intra-prediction mode in the first set of intra-prediction modes, wherein the second mapping maps a plurality of modes of the second set of intra-prediction modes to a single intra-prediction mode of the first set of intra-prediction modes.

33. A non-transitory digital storage medium having a computer program stored thereon to perform a method for encoding a picture on a data stream supporting a first set of intra-prediction modes including a plurality of directional prediction modes and at least one of a DC mode and a planar mode, and a second set of intra-prediction modes, said method, when the computer program is executed by a computer, comprising:

assigning, and encoding in a first signal in the data stream, the predetermined block to the first set of intra-prediction modes or the second set of intra-prediction modes, sorting the assigned set of prediction modes according to intra-prediction modes used for neighboring blocks, neighboring the predetermined block, to acquire a list of intra-prediction modes, determining, for the predetermined block, an index to an intra-prediction mode in the list of intra-prediction modes, predicting the predetermined block using an intra-prediction mode to which the index points, encoding the data stream, wherein the encoder is configured to, if the assigned set is the first set of intra-prediction modes, in sorting the assigned set, use a second mapping which maps each intra-prediction mode of the second set of intra-prediction modes to a representative intra-prediction mode in the first set of intra-prediction modes, wherein the second mapping maps a plurality of modes of the second set of intra-prediction modes to a single intra-prediction mode of the first set of intra-prediction modes.

* * * * *